US012650504B2

(12) United States Patent　　　　　(10) Patent No.: US 12,650,504 B2
Jo et al.　　　　　　　　　　　　　　　(45) Date of Patent:　　　　Jun. 9, 2026

(54) ELECTRONIC DEVICE FOR PROVIDING VIRTUAL ANTENNA ARRAY FOR RADAR SYSTEM

(71) Applicant: SAMSUNG ELECTRONICS CO., LTD., Suwon-si (KR)

(72) Inventors: Hyewon Jo, Suwon-si (KR); Namjun Cho, Suwon-si (KR); Jihee Kang, Suwon-si (KR); Hyoseok Na, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 571 days.

(21) Appl. No.: 18/083,926

(22) Filed: Dec. 19, 2022

(65) Prior Publication Data

US 2023/0280455 A1　　　Sep. 7, 2023

Related U.S. Application Data

(63) Continuation of application No. PCT/KR2022/019909, filed on Dec. 8, 2022.

(30) Foreign Application Priority Data

Mar. 4, 2022　　(KR) ........................ 10-2022-0028137
Mar. 24, 2022　　(KR) ........................ 10-2022-0036895

(51) Int. Cl.
　　*G01S 13/42*　　　　　(2006.01)
　　*G01S 13/62*　　　　　(2006.01)
　　*H01Q 1/22*　　　　　(2006.01)
(52) U.S. Cl.
　　CPC .............. *G01S 13/42* (2013.01); *G01S 13/62* (2013.01); *H01Q 1/22* (2013.01)

(58) Field of Classification Search
　　CPC .......... G01S 13/42; G01S 13/62; G01S 7/028; G01S 7/03; G01S 13/343; H01Q 1/22;
　　　　　　　　(Continued)

(56) References Cited

U.S. PATENT DOCUMENTS 8,111,640 B2　　2/2012　Knox
12,181,581 B2　　12/2024　Tsvelykh et al.
　　　　　(Continued)

FOREIGN PATENT DOCUMENTS

CN　　　112533293 A　　3/2021
CN　　　112567262 A　　3/2021
　　　　　(Continued)

OTHER PUBLICATIONS

Extended European Search Report dated Apr. 9, 2025 for EP Application No. 22930037.1.
(Continued)

*Primary Examiner* — William Kelleher
*Assistant Examiner* — Juliana Cross
(74) *Attorney, Agent, or Firm* — NIXON & VANDERHYE P.C.

(57)　　　　　　ABSTRACT

An electronic device may include an integrated circuit (IC) including a switch and a plurality of paths that may include a first transmit (Tx) path, a second Tx path, a first receive (Rx) path, and a second Rx path; a first antenna electrically connected with the first Tx path from among the plurality of paths; a second antenna electrically connectable with the second Tx path or the second Rx path from among the plurality of paths via the switch; a third antenna electrically connected with the first Rx path from among the plurality of paths; and at least one processor operably coupled with the IC.

18 Claims, 20 Drawing Sheets

(58) Field of Classification Search

CPC .......... H01Q 1/243; H01Q 1/364; H01Q 3/24; H01Q 9/0407; H01Q 21/065; H01Q 21/28

See application file for complete search history.

(56) References Cited

U.S. PATENT DOCUMENTS

| | | | |
|---|---|---|---|
| 2017/0293017 A1* | 10/2017 | Evangelista | ............ G01S 7/034 |
| 2018/0041241 A1* | 2/2018 | Trotta | .................... H04B 1/385 |
| 2019/0123452 A1 | 4/2019 | Trotta et al. | |
| 2019/0195984 A1 | 6/2019 | Goda | |
| 2019/0379140 A1 | 12/2019 | Heo et al. | |
| 2020/0103515 A1 | 4/2020 | Kishigami et al. | |
| 2020/0112086 A1 | 4/2020 | Kim et al. | |
| 2020/0158861 A1 | 5/2020 | Cattle et al. | |
| 2021/0091465 A1 | 3/2021 | Park et al. | |
| 2021/0408985 A1 | 12/2021 | Arkiszewski et al. | |
| 2022/0146623 A1 | 5/2022 | Lao et al. | |
| 2022/0381897 A1* | 12/2022 | Fang | ......................... G01S 7/03 |
| 2023/0019092 A1* | 1/2023 | Wei | .......................... H04B 1/40 |

FOREIGN PATENT DOCUMENTS

| | | | |
|---|---|---|---|
| CN | 114122745 A | 3/2022 | |
| EP | 3471197 A2 * | 4/2019 | ............ G01S 13/34 |
| JP | 2019-60732 A | 4/2019 | |
| KR | 10-2097080 B1 | 3/2020 | |
| KR | 10-2021-0093967 A | 7/2021 | |
| KR | 10-2022-0001480 A | 1/2022 | |

OTHER PUBLICATIONS

International Search Report dated Mar. 15, 2023 for PCT/KR2022/019909.
Written Opinion dated Mar. 15, 2023 for PCT/KR2022/019909.
Indian Patent Office First Examination Report dated Feb. 10, 2026 for corresponding Indian patent application 202417066585.

* cited by examiner

RECEIVE FIRST REFLECTION SIGNALS THROUGH SECOND ANTENNA
AND THIRD ANTENNA, WITHIN FIRST TIME INTERVAL      ~1901

RECEIVE SECOND REFLECTION SIGNALS THROUGH
THIRD ANTENNA, WITHIN SECOND TIME INTERVAL      ~1903

ELECTRONIC DEVICE FOR PROVIDING VIRTUAL ANTENNA ARRAY FOR RADAR SYSTEM

CROSS-REFERENCE TO RELATED APPLICATIONS

This application is a continuation of International Application No. PCT/KR2022/019909, filed on Dec. 8, 2022, designating the United States, in the Korean Intellectual Property Receiving Office, and claiming priority to Korean patent application number 10-2022-0028137 filed on Mar. 4, 2022, and Korean patent application number 10-2022-0036895 filed on Mar. 24, 2022, the disclosures of which are all hereby incorporated by reference herein in their entireties.

BACKGROUND

Field

Various example embodiments relate to an electronic device for providing a virtual antenna array for a radar (radio detection and ranging) system.

Description of Related Art

An electronic device may include a distance between the electronic device and an external object, relative location relation between the electronic device and the external object, and a radar (radio detection and ranging) system, which is a detection system that uses radio waves (or electromagnetic waves) to identify the speed of the external object. For example, the radio waves transmitted from the radar system in the electronic device may be reflected off the external object and returned to the radar system. The radio waves returned to the radar system may include information on the external object (e.g., relative location relation between external objects, a movement of the external object, and/or a posture of the external object).

SUMMARY

According to an example embodiment, an electronic device may comprise an integrated circuit (IC) comprising a switch and a plurality of paths that comprises a first transmit (Tx) path, a second Tx path, a first receive (Rx) path, and a second Rx path; a first antenna electrically connected with the first Tx path from among the plurality of paths; a second antenna electrically connectable with the second Tx path or the second Rx path from among the plurality of paths via the switch; a third antenna electrically connected with the first Rx path from among the plurality of paths; and at least one processor operably coupled with the IC. In an embodiment, at least one processor may be configured to receive, through the second antenna electrically connected with the second Rx path via the switch and the third antenna electrically connected with the first Rx path, first reflection signals regarding a first signal transmitted within a first time interval through the first antenna electrically connected with the first Tx path, within the first time interval. In an embodiment, at least one processor may be configured to receive, through the third antenna electrically connected with the first Rx path, second reflection signals regarding a second signal transmitted within a second time interval different from the first time interval through the second antenna electrically connected via the switch with the second Tx path, within the second time interval.

According to an example embodiment, an electronic device may comprise a plurality of antennas comprising a first antenna, a second antenna, a third antenna, a fourth antenna, a fifth antenna, and a sixth antenna; an integrated circuit (IC) comprising a first switch, a second switch, a transmit (Tx) path electrically connectable with the first antenna or the second antenna from among the plurality of antennas via the first switch, a first receive (Rx) path electrically connected with the third antenna from among the plurality of antennas, a second Rx path electrically connected with the fourth antenna from among the plurality of antennas, and a third Rx path electrically connectable with the fifth antenna or sixth antenna from among the plurality of antennas via the second switch; and at least one processor operably coupled with the IC. In an embodiment, at least one processor may be configured to receive, through the third antenna, the fourth antenna, and the fifth antenna electrically connected with the third Rx path via the second switch, first reflection signals regarding a first signal transmitted within a first time interval through the first antenna electrically connected with the Tx path via the first antenna, within the first time interval. In an embodiment, at least one processor may be configured to receive, through the third antenna, the fourth antenna, and the sixth antenna electrically connected with the third Rx path via the second switch, second reflection signals regarding a second signal transmitted within a second time interval different from the first time interval, within the second time interval.

According to an example embodiment, an electronic device may comprise a plurality of antennas comprising a first antenna, a second antenna, a third antenna, and a fourth antenna; an integrated circuit (IC) comprising a first switch, a second switch, a third switch, a transmit (Tx) path electrically connected with the first antenna via the first switch or electrically connected with the second antenna via the first switch and the third switch, a first receive (Rx) path electrically connected with the second antenna via the second switch and the third switch or electrically connected with the third antenna via the second antenna, and a second Rx path electrically connected with the fourth antenna; and at least one processor operably coupled with the IC. In an embodiment, at least one processor may be configured to receive, through the second antenna electrically connected with the first Rx path via the second switch and the third switch and the fourth antenna electrically connected with the second Rx path, first reflection signals regarding a first signal transmitted within a first time interval through the first antenna electrically connected with the Tx path via the first switch, within the first time interval. In an embodiment, at least one processor may be configured to receive, through the third antenna electrically connected with the first Rx path via the second switch and the fourth antenna electrically connected with the second Rx path, second reflection signals regarding a second signal transmitted within a second time interval different from the first time interval through the second antenna electrically connected with the Tx path via the first switch and the third switch, within the second time interval.

BRIEF DESCRIPTION OF THE DRAWINGS

The above and other aspects, features, and advantages of certain example embodiments of the present disclosure will be more apparent from the following detailed description, taken in conjunction with the accompanying drawings, in which.

DETAILED DESCRIPTION

An electronic device such as a portable device or a multifunctional device may include a radar (radio detection and ranging) system to obtain information on an external device around the electronic device. The radar system may include antennas for transmitting radio waves and receiving radio waves, an Integrated circuit (IC) (e.g., front-end IC) including a transmit path (Tx path) for transmitting the radio waves and a receive path (Rx path) for receiving the radio waves. Since the radar system includes the antennas and the IC, the radar system may be relatively bulky with respect to a mounting space of the electronic device. Accordingly, a method for reducing the size of the radar system may be required within the electronic device.

Figure 1:
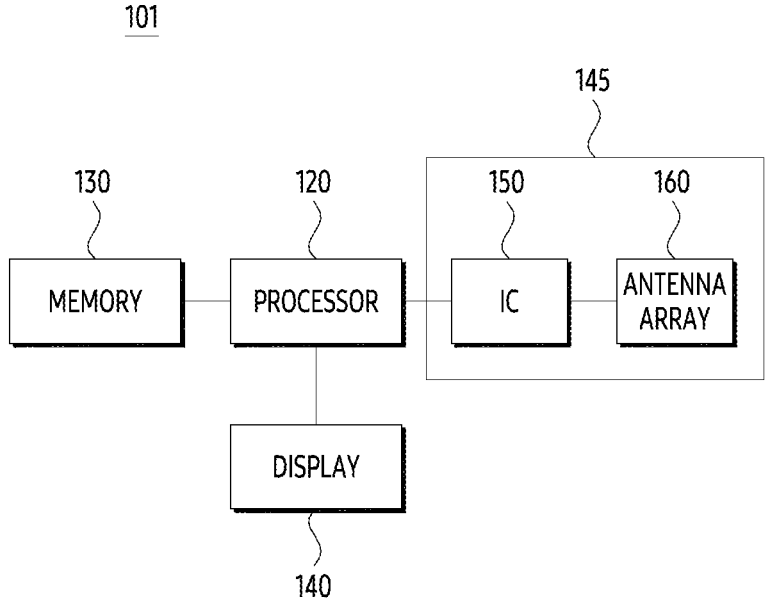
FIG. 1 illustrates an example of functional configurations of an electronic device according to an example embodiment.

FIG. 1 illustrates an example of functional configurations of an electronic device according to an embodiment.

Referring to FIG. 1, the electronic device 101 may include components including a processor 120, a memory 130, a display 140, and a radar system 145 (e.g., an integrated circuit (IC) 150 and an antenna array 160). The components are merely exemplary. For example, the electronic device 101 may further include another component (e.g., a power management integrated circuit (PMIC)). For example, some components may be omitted from the electronic device 101.

Processor 120 may be implemented with one or more integrated circuit (IC) chips and may execute various data processing. For example, the processor 120 may be implemented as a system on chip (SoC). The processor 120 includes sub-components including a central processing unit (CPU), a graphics processing unit (GPU), a neural processing unit (NPU), an image signal processor (ISP), a display controller, a memory controller, a storage controller, a communication processor (CP), and/or a sensor interface. The sub-components are merely exemplary. For example, the processor 120 may further include other sub-components. For example, the processor 120 may further include other sub-components. For example, some sub-components may be omitted from the processor 120. In an embodiment, the processor 120 may be configured to obtain information on an external object (e.g., relative location relation between external objects, movement of external objects and/or posture of external objects) around the electronic device 101 using the radar system 145 in the electronic device 101. For example, the processor 120 may be configured to control the radar system 145 to transmit radio waves towards the external object. For example, the radio waves may be reflected off the external object and return to the radar system 145. For example, the processor 120 may be configured to control the radar system 145 to receive the radio waves returned to the radar system 145. For example, the processor 120 may be configured to obtain the information on the external object based on the received radio waves.

The memory 130 may be used to store one or more programs including instructions. For example, the instructions may be executed by the processor 120. For example, the memory 130 may include a volatile memory and/or a nonvolatile memory. "Based on" as used herein covers based at least on.

The display 140 may be used to display an image obtained by processor 120.

The radar system 145 may include an IC 150 and an antenna array 160. The IC 150 for the radar system 145 may include a circuit for transmitting the radio waves and receiving the radio waves. For example, the IC 150 may include a transmission front-end circuit and a reception front-end circuit. For example, the IC 150 may include a plurality of paths including at least one transmit path (Tx path) and at least one receive path (Rx path) and at least one switch. In an embodiment, the IC 150 may further include a digital-to-analog converter (DAC) and an analog-to-digital converter (ADC). In an embodiment, the IC 150 may further include a voltage controlled oscillator (VCO). In an embodiment, the IC 150 may further include a baseband amplifier. In an embodiment, the IC 150 may further include at least one filter. However, it is not limited thereto.

In an embodiment, the IC 150 may be dedicated only for the radar system 145. In an embodiment, the IC 150 may be at least one IC used for communication with an external electronic device and used to support an antenna array including a plurality of antenna elements. For example, the at least one IC may include an RFIC and/or an intermediate frequency (IF) IC. However, it is not limited thereto. For example, when an IC 150 is the at least one IC, the IC 150 may be used for the radar system 145 within other time resources that are distinct from time resources used for communication with the external electronic device. However, it is not limited thereto.

The antenna array 160 for the radar system 145 may include a plurality of antennas. For example, the plurality of antennas may be disposed in an arrangement for forming a virtual antenna array. For example, a distance between an antenna from among the plurality of antennas and another antenna right next to the antenna from among the plurality of antennas may be more than half of a wavelength (e.g., a minimum wavelength) of a signal transmitted from the radar system 145.

In an embodiment, the antenna array 160 may be dedicated only for the radar system 145. In an embodiment, the antenna array 160 may be an antenna array including a plurality of antenna elements used for communication with an external electronic device. For example, when the antenna array 160 is the antenna array including the plurality of antenna elements, the antenna array 160 may be used for the radar system 145 within other time resources distinct from time resources used for communication with the external electronic device. However, it is not limited thereto.

Figure 2:
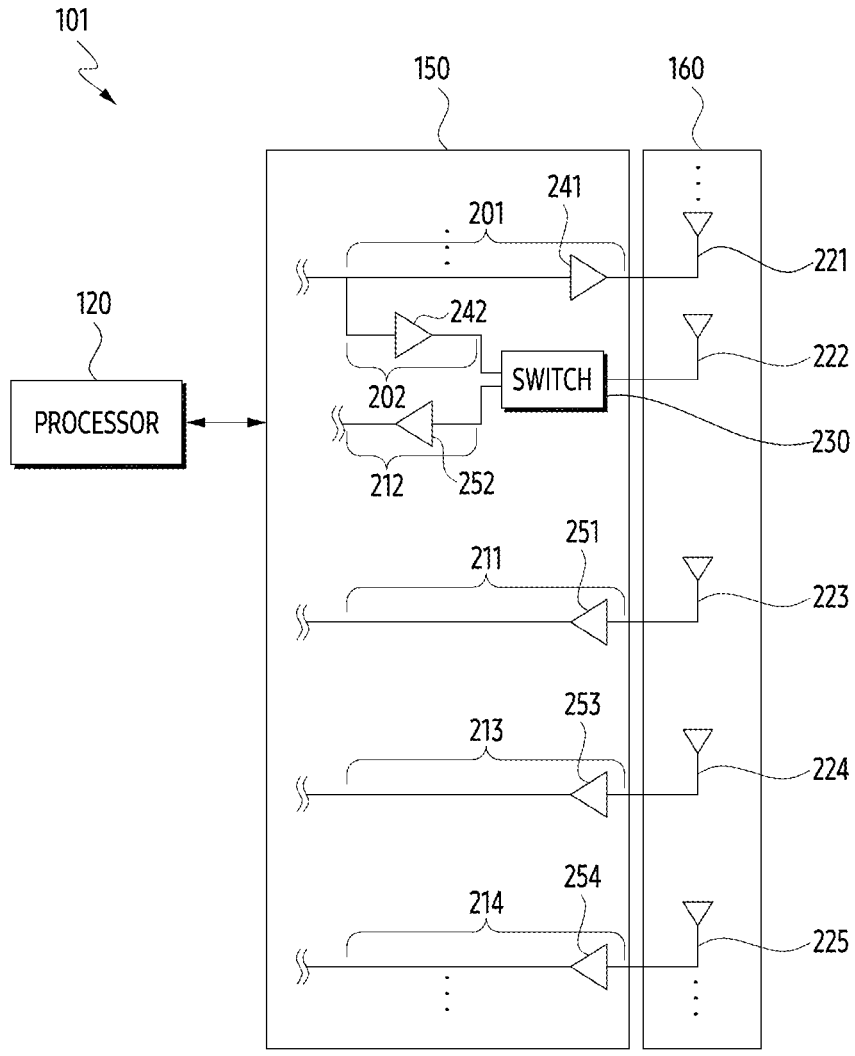
FIG. 2 illustrates an example of a configuration of a radar system in an electronic device according to an example embodiment.

In an embodiment, the plurality of antennas in the antenna array 160 may include an antenna connected with a Tx path in the IC 150 and an antenna connected with a Rx path in the IC 150. In an embodiment, the plurality of antennas may include an antenna electrically connectable with a Tx path or a Rx path from among the plurality of paths in the IC 150 through the switch in the IC 150. For example, the plurality of antennas may be illustrated through the description of FIG. 2. FIG. 2 illustrates an example of a configuration of a radar system in an electronic device according to an embodiment.

For example, referring to FIG. 2, the plurality of antennas in the antenna array 160 may include a first antenna 221 electrically connected, directly or indirectly, with a first Tx path 201 in the IC 150, a third antenna 223 electrically connected, directly or indirectly, with a first Rx path 211 in the IC 150, and the second antenna 222 electrically connected, directly or indirectly, with a second Tx path 202 or a second Rx path 212 through a switch 230 in the IC 150. In an embodiment, the first Tx path 201 may include a first power amplifier (PA) 241 for setting transmit power of a first signal transmitted through the first antenna 221. For example, the first signal may be a signal having frequency changed according to time. For example, the first signal may be a chirp signal. However, it is not limited thereto. In an embodiment, the second Tx path 202 may include a second PA 242 for setting the Tx power of the second signal transmitted through the second antenna 222. For example, the second signal may be a signal having frequency changed according to time. For example, the second signal may be a chirp signal. However, it is not limited thereto. In an embodiment, the first Rx path 211 may include a first low noise amplifier (LNA) 251 for amplifying the power of signals (e.g., first reflection signals regarding the first signal and second reflection signals regarding the second signal) received through the third antenna 223. Although not shown in FIG. 2, the first Rx path 211 may further include a first mixer and a first filter. However, it is not limited thereto. In an embodiment, the second Rx path 212 may include a second LNA 252 for amplifying the power of signals (e.g., the first reflection signals) received through the second antenna 222. Although not shown in FIG. 2, the second Rx path 212 may further include a second mixer and a second filter. However, it is not limited thereto.

In an embodiment, the processor 120 may transmit the first signal through the first antenna 221 electrically connected with the first Tx path 201 within the first time interval (e.g., the first frame). The processor 120 may receive the first reflection signals that the first signal is reflected from the external object around the electronic device 101 within the first time interval through a third antenna 223 electrically connected with the first Rx path 211 and a second antenna 222 electrically connected with the second Rx path 212 through the switch 230. For example, the first reflection signals may be used to obtain at least one of first data regarding relative location relation (e.g., a distance between the electronic device 101 and the external object), second data regarding movement of the external object, or third data regarding posture of the external object.

Meanwhile, the processor 120 may receive the first reflection signals regarding the first signal transmitted through the first antenna 221, through the second antenna 222 and the third antenna 223, for use of two virtual antennas in the virtual antenna array. For example, the two virtual antennas in the virtual antenna array may be defined based on the transmission through the first antenna 221, the reception through the second antenna 222, and the reception through the third antenna 223.

In an embodiment, the processor 120 may transmit the second signal through the second antenna 222 electrically connected with the second Tx path 202 through the switch 230, within the second time interval (e.g., the second frame). For example, the second time interval may be a time interval after the first time interval. The processor 120 may receive the second reflection signals that the second signal is reflected from the external object around the electronic device 101, through the third antenna 223 electrically connected with the first Rx path 211, within the second time interval. For example, the second reflection signals may be used together with the first reflection signals to obtain at least one of the first data, the second data, or the third data.

Meanwhile, the processor 120 may receive the second reflection signals regarding the second signal transmitted through the second antenna 222, for use of a virtual antenna in the virtual antenna array distinct from the two virtual antennas, through the third antenna 223. For example, the virtual antenna in the virtual antenna array may be defined based on the transmission through the second antenna 222 and the reception through the third antenna 223.

Figure 3:
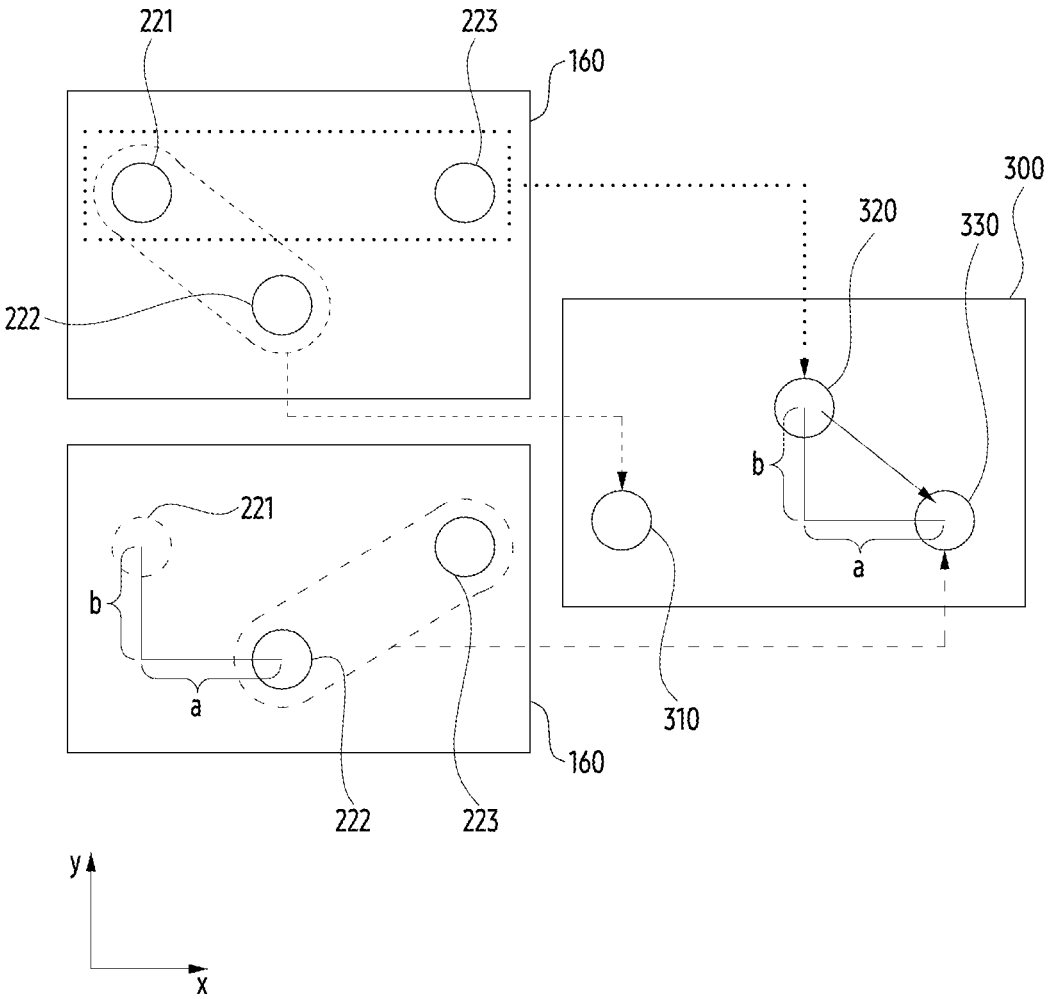
FIGS. 3 and 4 illustrate an example of forming a virtual antenna array using a radar system in an electronic device according to an example embodiment.
Figure 4:
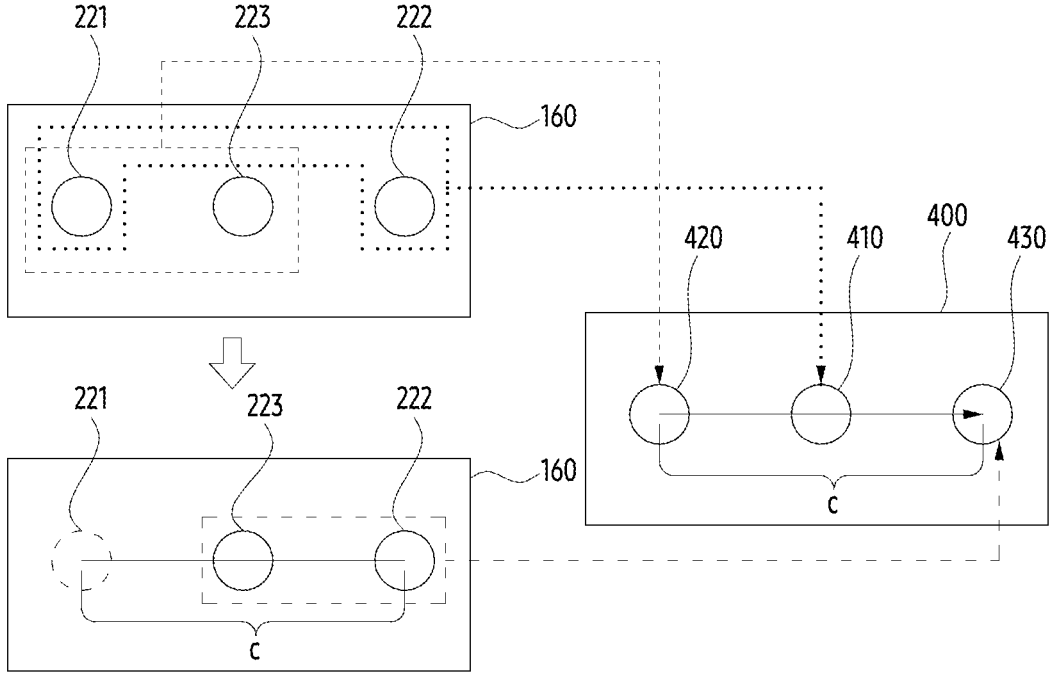
Figure 4:
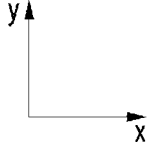

For example, the first antenna 221, the second antenna 222, and the third antenna 223 may be disposed to form the virtual antenna array. For example, the arrangement of virtual antennas in the virtual antenna array may be defined based on the arrangement of the first antenna 221, the second antenna 222, and the third antenna 223. For example, the arrangement of the virtual antennas in the virtual antenna array defined based on the arrangement of the first antenna 221, the second antenna 222, and the third antenna 223 may be illustrated through the description of FIGS. 3 and 4. FIGS. 3 and 4 illustrate an example of forming a virtual antenna array using a radar system in an electronic device according to an embodiment.

For example, referring to FIG. 3, the first antenna 221, the second antenna 222 disposed at a location spaced apart from the first antenna 221 by a distance 'a' in the x-axis direction and spaced apart by a distance 'b' in the −y-axis direction, and the third antenna 223 disposed at a location spaced apart from the first antenna 221 in the x-axis direction may form a virtual antenna array 300. For example, the first virtual antenna 310 may be formed in the virtual antenna array 300 based on transmitting the first signal through the first antenna 221 within the first time interval and receiving the first reflection signals regarding the first signal through the second antenna 222 within the first time interval. For example, the first virtual antenna 310 in the virtual antenna array 300 may be defined based on the relative location relation between the first antenna 221 and the second antenna 222. For example, the second virtual antenna 320 may be formed in the virtual antenna array 300 based on transmitting the first signal through the first antenna 221 within the first time interval and receiving the first reflection signals regarding the first signal through the third antenna 223 within the first time interval. For example, the second virtual antenna 320 in the virtual antenna array 300 may be defined based on the relative location relation between the first antenna 221 and the third antenna 223. For example, the third virtual antenna 330 may be formed in the virtual antenna array 300 based on transmitting the second signal through the second antenna 222 within the second time interval and receiving the second reflection signals regarding the second signal through the third antenna 223 within the second time interval. For example, the third virtual antenna 330 in the virtual antenna array 300 may be defined within the virtual antenna array 300 based on the relative location relation between the first antenna 221 and the second antenna 222 and the location of the second virtual antenna 320. For example, when the second antenna 222 is spaced apart from the first antenna 221 by a distance 'a' in the x-axis direction and a distance 'b' in the −y-axis direction, the virtual antenna 330 may be defined, within the virtual antenna array 300, at a location spaced apart from the second virtual antenna 320 that is formed based on the relative location relation between the first antenna 221 and the third antenna 223 by a distance 'a' in the x-axis direction and a distance 'b' in the −y-axis direction. However, it is not limited thereto.

For another example, refer to FIG. 4, when the first antenna 221, the second antenna 222, and the third antenna 223 are disposed in the x-axis direction, the virtual antenna array 400 formed based on the first antenna 221, the second antenna 222, and the third antenna 223 may be different from the virtual antenna array 300. For example, the first virtual antenna 410 may be formed in the virtual antenna array 400 based on transmitting the first signal through the first antenna 221 in the first time interval and receiving the first reflection signals regarding the first signal through the second antenna 222 in the first time interval. For example, the first virtual antenna 410 in the virtual antenna array 400 may be defined based on the relative location relation between the first antenna 221 and the second antenna 222. For example, the second virtual antenna 420 may be formed in the virtual antenna array 400 based on transmitting the first signal through the first antenna 221 in the first time interval and receiving the first reflection signals regarding the first signal through the third antenna 223 in the first time interval. For example, the second virtual antenna 420 in the virtual antenna array 400 may be defined based on the relative location relation between the first antenna 221 and the third antenna 223. For example, the third virtual antenna 430 may be formed in the virtual antenna array 400 based on transmitting the second signal through the second antenna 222 in the second time interval and receiving the second reflection signals regarding the second signal through the third antenna 223 in the second time interval. For example, the third virtual antenna 430 in the virtual antenna array 400 may be defined, within the virtual antenna array 400, based on the relative location relation between the first antenna 221 and the second antenna 222 and the location of the second virtual antenna 420. For example, when the second antenna 222 is spaced apart from the first antenna 221 by a distance 'c' in the x-axis direction, the virtual antenna 430 may be defined at a location spaced apart by a distance 'c' in the x-axis direction from the second virtual antenna 420 formed based on the relative location relation between the first antenna 221 and the third antenna 223, within the virtual antenna array 400. However, it is not limited thereto.

Figure 5:
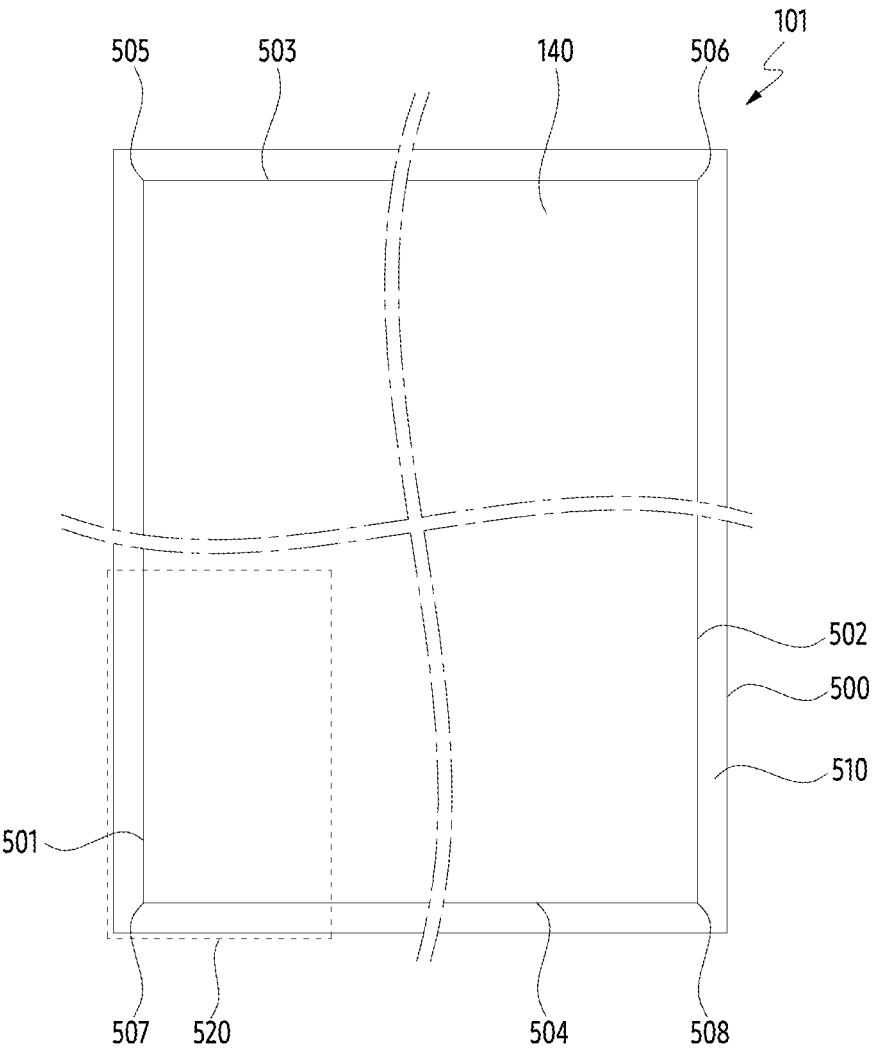
FIG. 5 illustrates an exemplary housing of an electronic device according to an example embodiment.

Referring to FIG. 2, according to various embodiments, the plurality of antennas in the antenna array 160 may further include a fourth antenna 224 electrically connected, directly or indirectly, with the third Rx path 213 in the IC 150 including the third LNA 253 and a fifth antenna 225 electrically connected, directly or indirectly, with the fourth Rx path 214 in the IC 150 including the fourth LNA 254. In an embodiment, the first antenna 221, the second antenna 222, the third antenna 223, the fourth antenna 224, and the fifth antenna 225 may be exposed through a part of the housing of the electronic device 101, and may be disposed along the first periphery of the display 140 including a first periphery, a second periphery parallel to the first periphery, a third periphery extended from a first end of the first periphery to a first end of the second periphery facing the first end of the first periphery, and a fourth periphery extended from a second end of the first periphery to a second end of the second periphery opposite the second end of the first periphery and parallel to the third periphery. For example, the arrangement of the first antenna 221, the second antenna 222, the third antenna 223, the fourth antenna 224, and the fifth antenna 225 may be illustrated through the description of FIG. 5. FIG. 5 illustrates an exemplary housing of an electronic device according to an embodiment.

Figure 6:
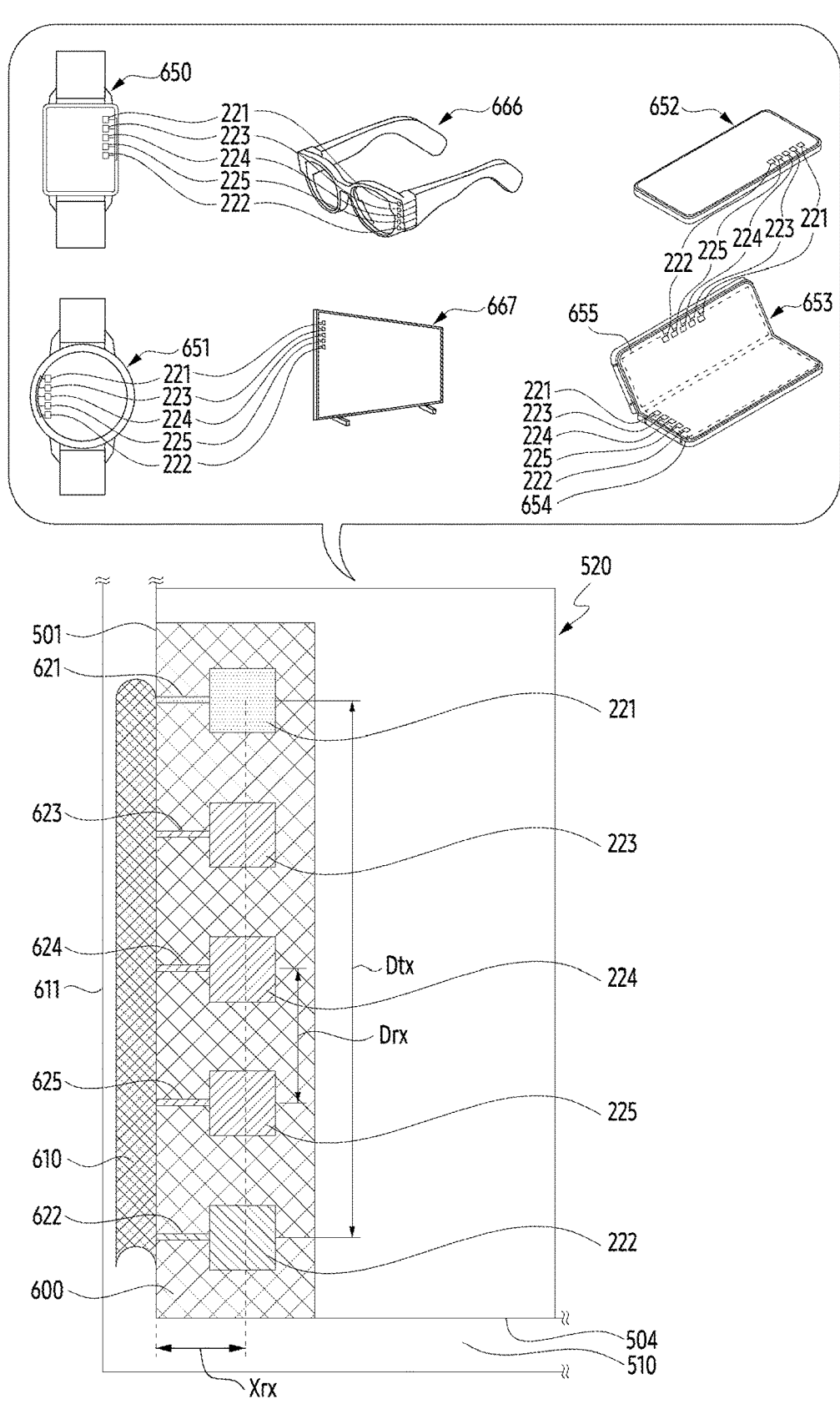
FIG. 6 illustrates an exemplary arrangement of antennas in a radar system, disposed on a display of an electronic device according to an example embodiment or within the display.

For example, referring to FIG. 5, the electronic device 101 may further include a housing 500 including the processor 120, the memory 130, the display 140, the IC 150, and the antenna array 160. In an embodiment, the display 140 may be exposed through a part of the housing 500. In an embodiment, the display 140 may be surrounded by the bezel area 510 of the housing 500 when viewed from above. In an embodiment, the display 140 may include a first periphery 501, a second periphery 502 parallel to the first periphery 501, a third periphery 503 extended from the first end 505 of the first periphery 501 to the first end 506 of the second periphery 502, and a fourth periphery 504 extended from the second end 507 of the first periphery 501 to the second end 508 of the second periphery 502 and parallel to the third periphery 503. In an embodiment, the first antenna 221, the second antenna 222, the third antenna 223, the fourth antenna 224, and the fifth antenna 225 may be disposed along the first periphery 501 within the area 520. In an embodiment, the first antenna 221, the second antenna 222, the third antenna 223, the fourth antenna 224, and the fifth antenna 225 may be included in the display 140 when viewed from above (e.g., in a direction in which the display 140 is exposed to the outside). In an embodiment, the first antenna 221, the second antenna 222, the third antenna 223, the fourth antenna 224, and the fifth antenna 225 may be disposed on a metal plate having a mesh pattern, which is disposed within the area 520 along the first periphery 501. For example, the first antenna 221, the second antenna 222, the third antenna 223, the fourth antenna 224, and the fifth antenna 225 disposed on, directly or indirectly, the metal plate may be illustrated through the description of FIG. 6. FIG. 6 illustrates an exemplary arrangement of antennas in a radar system, disposed on a display of an electronic device according to an embodiment or within the display.

For example, referring to FIG. 6, the electronic device 101 may include a metal plate 600 having a mesh pattern, which is disposed under a glass (not shown in FIG. 6) disposed on the display 140, disposed on a plurality of pixels in the display 140, and disposed along the first periphery 501 within the area 520 when viewed from above. For example, the first antenna 221, the second antenna 222, the third antenna 223, the fourth antenna 224, and the fifth antenna 225 may be disposed along the first periphery 501 on the metal plate 600. For example, the first antenna 221, the second antenna 222, the third antenna 223, the fourth antenna 224, and the fifth antenna 225 disposed along the first periphery 501 on the metal plate 600 may be connected, directly or indirectly, with the plurality of paths of the IC 150 through at least one connector 610. For example, at least one connector 610 may be disposed under the bezel area 510 of the housing 500. For example, at least one connector 610 may be disposed along the periphery 611 of the surface of the housing 500 including the bezel area 510 parallel to the first periphery 501 of the display 140. In an embodiment, the first antenna 221 may be electrically connected, directly or indirectly, with a first feedline 621 extended from at least one connector 610. In an embodiment, the second antenna 222 may be electrically connected, directly or indirectly, with a second feedline 622 extended from at least one connector 610. In an embodiment, the third antenna 223 may be electrically connected, directly or indirectly, with the third feedline 623 extended from at least one connector 610. In an embodiment, the fourth antenna 224 may be electrically connected, directly or indirectly, with the fourth feedline 624 extended from at least one connector 610. In an embodiment, the fifth antenna 225 may be electrically connected, directly or indirectly, with the fifth feedline 625 extended from at least one connector 610.

In an embodiment, an arrangement of the first antenna 221, the second antenna 222, the third antenna 223, the fourth antenna 224, and the fifth antenna 225 within the area 520 may be applied to various types of electronic devices. In an embodiment, the arrangement of the first antenna 221, the second antenna 222, the third antenna 223, the fourth antenna 224, and the fifth antenna 225 may be applied to a smart watch 650 or a smart watch 651. For example, the first antenna 221, the second antenna 222, the third antenna 223, the fourth antenna 224, and the fifth antenna 225 may be disposed along a periphery of a display of the smart watch 650 or the smart watch 651. For another example, the arrangement of the first antenna 221, the second antenna 222, the third antenna 223, the fourth antenna 224, and the fifth antenna 225 may be applied to a bar-type smartphone 652. For example, the first antenna 221, the second antenna 222, the third antenna 223, the fourth antenna 224, and the fifth antenna 225 may be disposed along a periphery of a display of the smartphone 652. For another example, the arrangement of the first antenna 221, the second antenna 222, the third antenna 223, the fourth antenna 224, and the fifth antenna 225 may be applied to a smartphone 653 including a foldable display. For example, the first antenna 221, the second antenna 222, the third antenna 223, the fourth antenna 224, and the fifth antenna 225 may be disposed along a periphery of the first area 654 of the foldable display. For example, the first antenna 221, the second antenna 222, the third antenna 223, the fourth antenna 224, and the fifth antenna 225 may be disposed along a periphery of the second area 655 of the foldable display. For another example, the arrangement of the first antenna 221, the second antenna 222, the third antenna 223, the fourth antenna 224, and the fifth antenna 225 may be applied to an augmented reality (AR) glass 666. For example, the first antenna 221, the second antenna 222, the third antenna 223, the fourth antenna 224, and the fifth antenna 225 are disposed along a periphery of a display of the AR glass 666, or disposed along a periphery of a frame surrounding the display of the AR glass 666. For another example, the arrangement of the first antenna 221, the second antenna 222, the third antenna 223, the fourth antenna 224, and the fifth antenna 225 may be applied to a television (TV) 667. For example, the first antenna 221, the second antenna 222, the third antenna 223, the fourth antenna 224, and the fifth antenna 225 may be disposed along the periphery of a display of the TV 667. However, it is not limited thereto.

Figure 7:
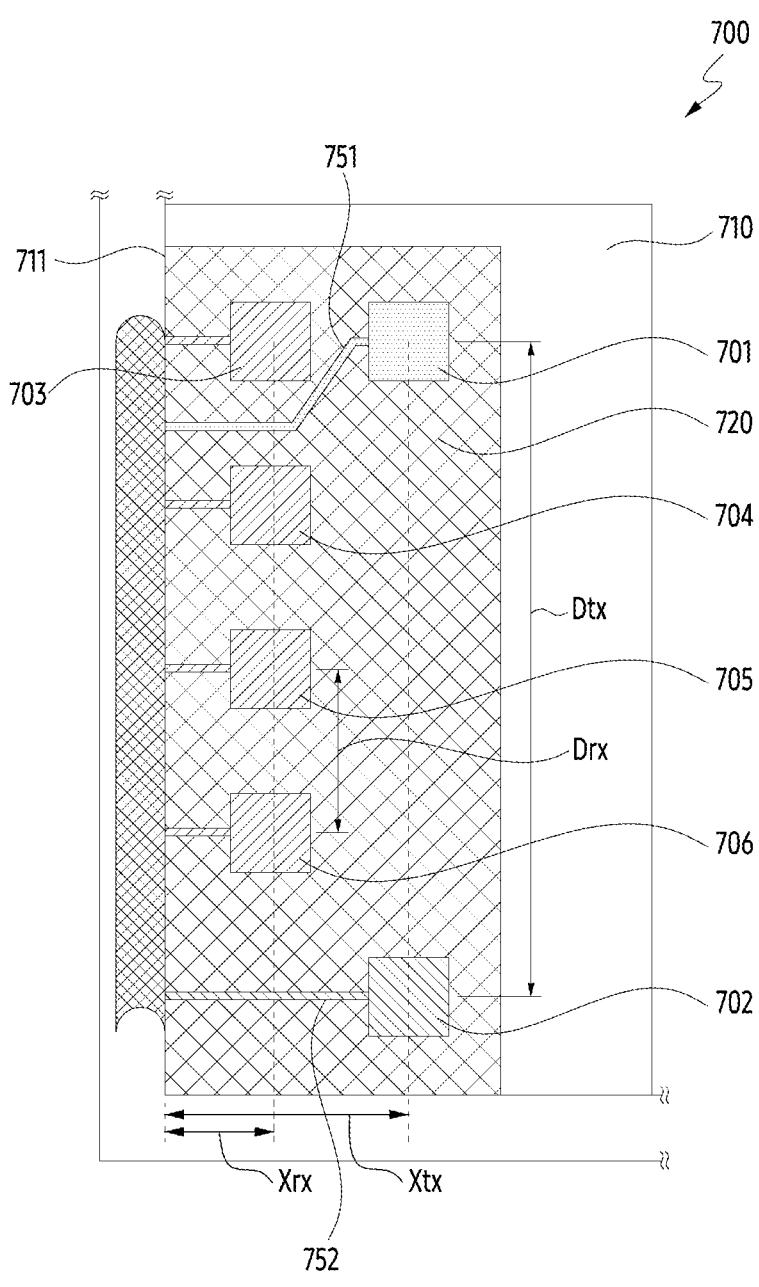
FIG. 7 illustrates an exemplary arrangement of antennas in a radar system, disposed on a display of an electronic device or within the display.

Referring to FIG. 2, in order to obtain information on the external object, a distance between the first antenna 221 used for transmitting the first signal and the second antenna 222 used for transmitting the second signal may be required to be equal to or greater than a certain distance. For example, in order to ensure a difference between the path of the first reflection signals and the path of the second reflection signals, the distance between the first antenna 221 and the second antenna 222 may be required to be equal to or greater than a certain distance. Since the electronic device 101 includes the second antenna 222 electrically connected with the second Tx path 202 or the second Rx path 212 through the switch 230, the first antenna 221 and the second antenna 222 spaced apart from the first antenna 221 by a certain distance or more may be disposed in a minimized (or optimized) space. For example, an arrangement of the first antenna 221 and the second antenna 222 within a minimized (or optimized) or reduced space may be illustrated by comparison with the arrangement of the antennas shown in FIG. 7. FIG. 7 illustrates an exemplary arrangement of antennas in a radar system, disposed on a display of an electronic device or within the display.

For example, referring to FIG. 7, an electronic device 700 may include a first antenna 701 connected with a Tx path, a second antenna 702 connected with another Tx path, and a third antenna 703 to a sixth antenna 706 respectively connected with Rx paths. For example, the electronic device 700 may include the second antenna 702 connected with the other Tx path, unlike the electronic device 101 in FIG. 2, which includes the second antenna 222 electrically connectable to the second Tx path 202 or the second Rx path 212 through the switch 230. The distance 'Dtx' between the first antenna 701 and the second antenna 702 in the electronic device 700 may be equal to or greater than a certain distance to secure the difference between the path of the reflection signals regarding the signal transmitted through the first antenna 701 and the path of the reflection signals regarding the signal transmitted through the second antenna 702. The electronic device 700 may include the third antenna 703 to the sixth antenna 706 spaced apart by a distance 'Xrx' from the periphery 711 of the display 710, the first antenna 701 spaced apart from the periphery 711 of the display 710 by a distance 'Xtx' longer than the distance 'Xrx', and the second antenna 702 spaced apart from the periphery 711 of the display 710 by the distance 'Xtx' and spaced apart from the first antenna 701 by the distance 'Dtx', so that the distance 'Dtx' between the first antenna 701 and the second antenna 702 is equal to or greater than a certain distance. For example, the first antenna 701 to the sixth antenna 706 may be disposed on, directly or indirectly, the metal plate 720 having a mesh pattern, which is disposed between a plurality of pixels of the display 710 and a glass on the display 710. For example, since the metal plate 720 includes the third antenna 703 to the sixth antenna 706 spaced apart by the distance 'Xrx' from the periphery 711 of the display 710, the first antenna 701 spaced apart by the distance 'Xtx' from the periphery 711 of the display 710, and the second antenna 702 spaced apart by the distance 'Xtx' from the periphery 711 of the display 710 and spaced apart by the distance 'Dtx' from the first antenna 701, the metal plate 720 may have a larger area than a value obtained by multiplying the distance 'Dtx' between the first antenna 701 and the second antenna 702 by the distance 'Xtx' at which the first antenna 701 and the second antenna 702 are respectively spaced apart from the periphery 711 of the display 710.

Meanwhile, referring to FIGS. 2 and 6, since the electronic device 101 includes the second antenna 222 electrically connectable with the second Tx path 202 or the second Rx path 212 through the switch 230, the first antenna 221, the second antenna 222, the third antenna 223, the fourth antenna 224, and the fifth antenna 225 may be disposed in a row, unlike the electronic device 700 illustrated in FIG. 7. For example, since the second antenna 222 may be electrically connectable with the second Tx path 202 or the second Rx path 212 through the switch 230, the second antenna 222 to be spaced apart from the first antenna 221 by a certain distance or more and to be spaced apart from each of the third antennas 223 to the fifth antenna 225 by a certain distance or more may be disposed in a row with the first antenna 221, the third antenna 223, the fourth antenna 224, and the fifth antenna 225, in order to secure a difference between the path of the reflection signals regarding the signal transmitted through the first antenna 221 and the path of the reflection signals regarding the signal transmitted through the second antenna 222. For example, the electronic device 101 may include the third antenna 223 disposed between the first antenna 221 and the second antenna 222, the fourth antenna 224, and the fifth antenna 225. For example, unlike the electronic device 700 illustrated in FIG. 7, the electronic device 101 may include the first antenna 221 to the fifth antenna 225 spaced apart from the first periphery 501 of the display 140 by a distance 'Xrx', respectively. For example, since the first antenna 221 to the fifth antenna 225 are disposed in a row, the metal plate 600 including the first antenna 221 to the fifth antenna 225 may be narrower than the area of the metal plate 720 illustrated in FIG. 7. For example, the metal plate 600 may have a larger area than a value obtained by multiplying the distance 'Dtx' between the first antenna 221 and the second antenna 222 by the distance 'Xrx' at which each of the first antenna 221 to the fifth antenna 225 is spaced apart from the first periphery 501 of the display 140, but may have a narrower area than the metal plate 720.

For example, since pixels within each of the display 140 and the display 710 are covered by the metal plate 600 and the metal plate 720, the pixels within each of display 140 and display 710 may have to emit a higher intensity of light than other pixels within each of display 140 and display 710. For example, since the metal plate 600 has a narrower area than the metal plate 720, the electronic device 101 may display the screen through the display 140, based on power smaller than power consumed in the electronic device 700 to display the screen through the display 710.

For another example, since the first antenna 221 and the second antenna 222 within the electronic device 101 are spaced apart from the first periphery 501 of the display 140 by a distance 'Xrx' shorter than the distance 'Xtx' at which each of the first antenna 701 and the second antenna 702 within the electronic device 700 are spaced apart from the periphery 711 of the display 710, each of the first feed line

621 of the first antenna 221 and the second feed line 622 of the second antenna 222 may be shorter than each of the first feed line 751 of the first antenna 701 and the second feed line 752 of the second antenna 702. For example, each of the first feed line 621 of the first antenna 221 and the second feed line 622 of the second antenna 222 is shorter than each of the first feed line 751 of the first antenna 701 and the second feed line 752 of the second antenna 702, a loss caused by each of the first feed line 621 and the second feed line 622 may be less than a loss caused by each of the first feed line 751 and the second feed line 752. For example, the deterioration of the gain of each of the first antenna 221 and the second antenna 222 within the electronic device 101 may be less than the deterioration of the gain of each of the first antenna 701 and the second antenna 702 within the electronic device 700.

Figure 8:
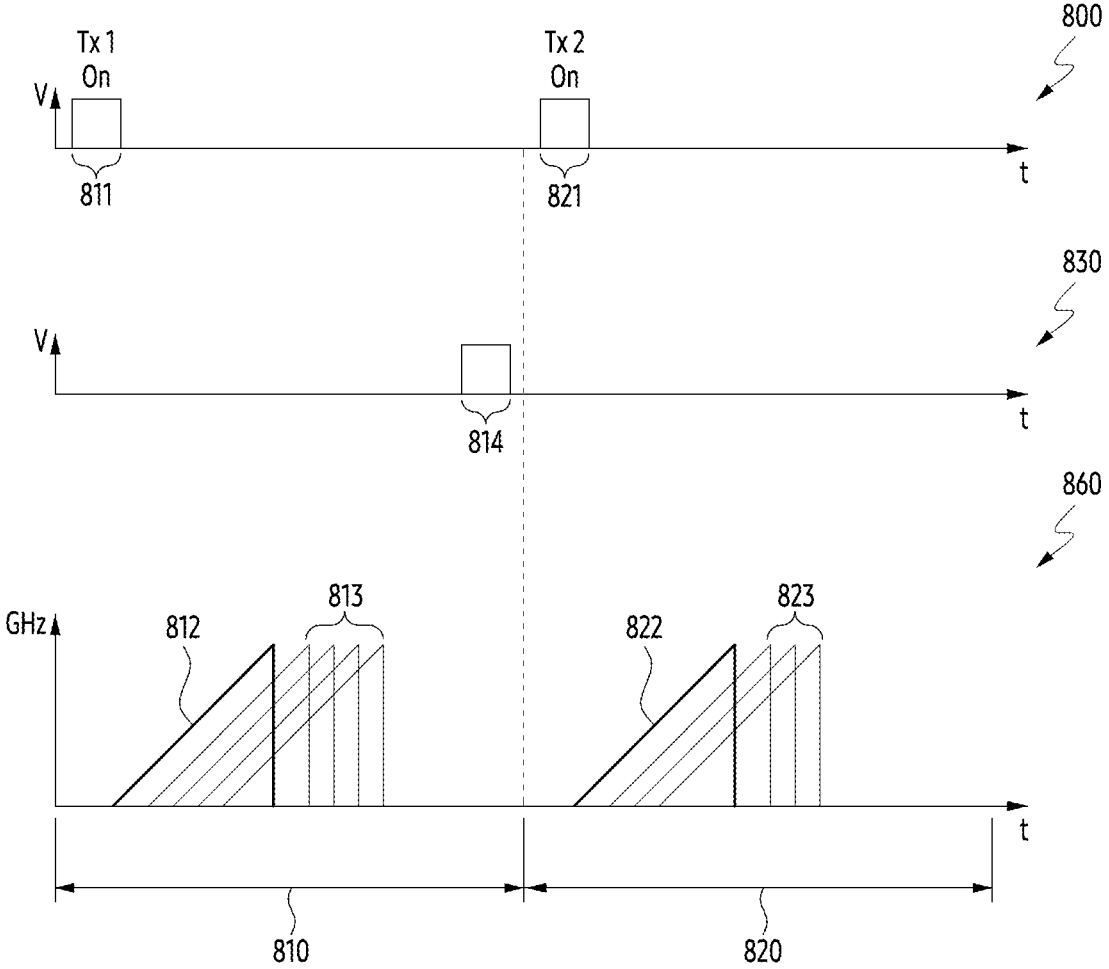
FIG. 8 illustrates an exemplary method of switching a path connected with an antenna in a radar system from a receive path (Rx path) to a transmit path (Tx path) using a switch, according to an example embodiment.

Meanwhile, referring back to FIG. 2, the processor 120 may control the switch 230 to switch the path connected with the second antenna 222 from the second Rx path 212 to the second Tx path 202 after transmitting the first signal through the first antenna 221 within the first time interval and receiving the first reflection signals regarding the first signal through the second antenna 222 to the fifth antenna 225. For example, the processor 120 may control the switch 230 to switch from the second Rx path 212 to the second Tx path 202 before the second time interval or within the second time interval. The processor 120 may turn on the second PA 242 within the second Tx path 202 electrically connected with the second antenna 222 based on the controlling of the switch 230. The processor 120 may transmit the second signal through the second antenna 222 within the second time interval and receive the second reflection signals regarding the second signal through the third antenna 223 to the fifth antenna 225, based on the turn-on of the second PA 242. For example, switching the path connected with the second antenna 222 from the Rx path to the Tx path using the switch 230 may be illustrated through the description of FIG. 8. FIG. 8 illustrates an exemplary method of switching a path connected to an antenna in a radar system from a receive path (Rx path) to a transmit path (Tx path) using a switch, according to an embodiment.

For example, referring to FIG. 8, the graph 800 indicates the state of the first PA 241 and the second PA 242, the graph 830 indicates the state of the switch 230, and the graph 860 indicates the state of transmission of the first signal, reception of the first reflection signals, transmission of the second signal, and reception of the second reflection signals. For example, the horizontal axis of the graph 800 indicates time, the vertical axis of the graph 800 indicates a voltage applied to each of the first PA 241 and the second PA 242, the horizontal axis of the graph 830 indicates time, and the vertical axis of the graph 830 indicates a voltage applied to control the switch 230, the horizontal axis of graph 860 indicates time, and the vertical axis of the graph 860 indicates frequencies of the first signal, the first reflection signals, the second signal, and the second reflection signals.

The processor 120 may transmit the first signal 812 through the first antenna 221 based on turning on the first PA 241 within the first Tx path 201 during the time 811 in the first time interval 810, while the second antenna 222 is electrically connected with the second Rx path 212 through the switch 230. The processor 120 may receive first reflection signals 813 regarding the first signal 812 through the second antenna 222 to the fifth antenna 225 in the first time interval 810. In response to the reception of the first reflection signals 813, the processor 120 may control the switch 230 to electrically disconnect the second Rx path 212 from the second antenna 222 and to electrically connect the second antenna 222 and the second Tx path 202 during the time 814 in the first time interval 810. The processor 120 may transmit the second signal 822 through the second antenna 222 based on turning on the second PA 242 in the second Tx path 202 during the time 821 in the second time interval 820 based on the controlling of the switch 230. The processor 120 may receive the second reflection signals 823 regarding the second signal 822 through the third antenna 223 to the fifth antenna 225 in the second time interval 820.

FIG. 8 illustrates an example in which the control of the switch 230 is executed (or performed) in the first time interval 810, but the controlling of the switch 230 may be performed in another time interval distinct from the first time interval 810. For example, the controlling of the switch 230 may be performed within a separate time interval (not shown in FIG. 8) between the first time interval 810 and the second time interval 820. For another example, the controlling of the switch 230 may be performed within the second time interval 820 before turning on the second PA 242. However, it is not limited thereto.

Figure 9:
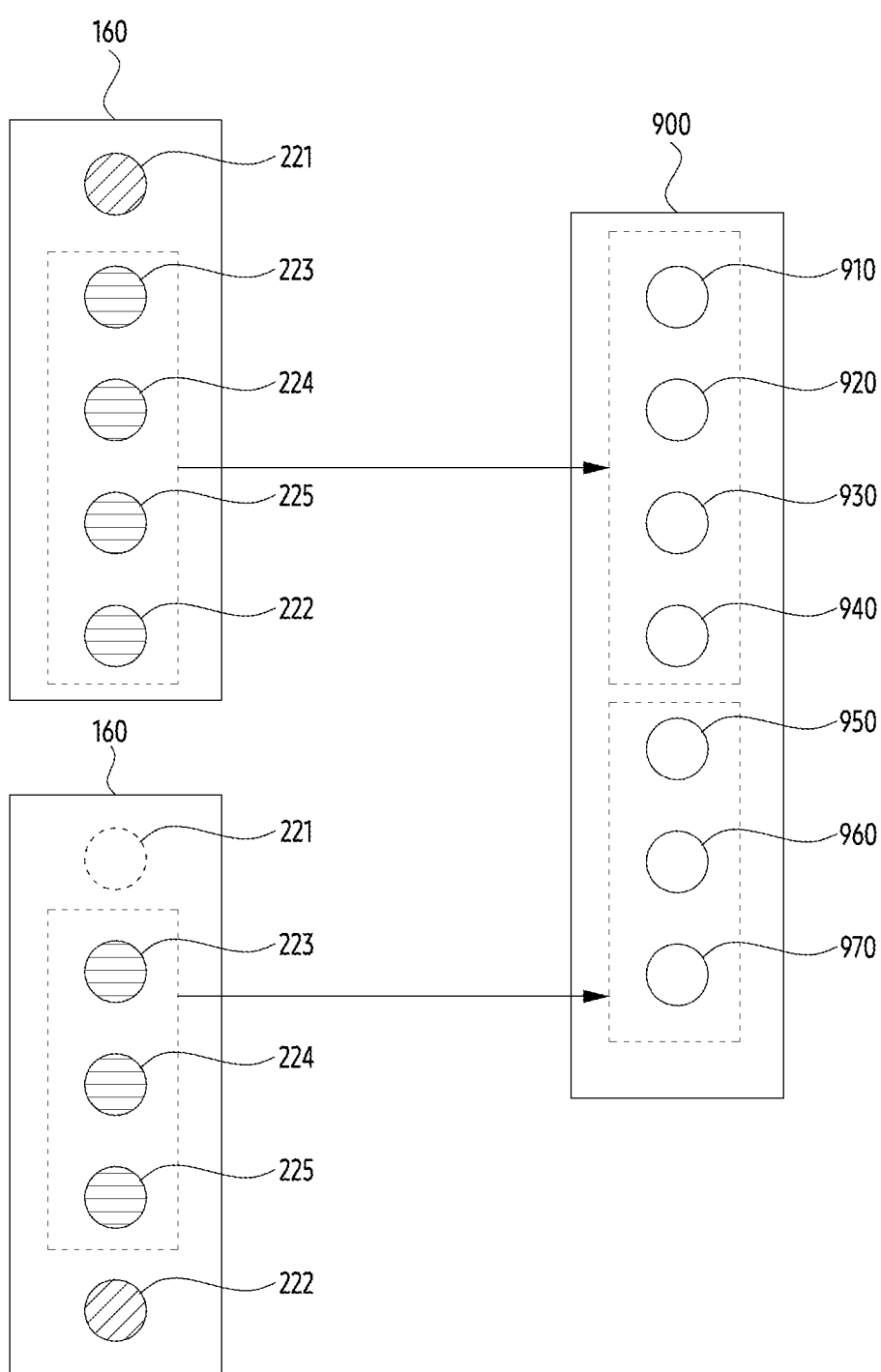
FIGS. 9 to 12 illustrate an example of a virtual antenna array formed using a radar system in an electronic device according to an example embodiment.

Meanwhile, the processor 120 may transmit the first signal 812 through the first antenna 221 in the first time interval 810, receive the first reflection signals 813 through the second antennas 222 to the fifth antennas 225, transmit the second signal 822 through the second antenna 222 in the second time interval 820, and receive the second reflection signals 823 through the third antenna 223 to the fifth antenna 225 so that the virtual antenna array is formed. For example, the virtual antenna array may be illustrated through the description of FIG. 9. FIG. 9 illustrates an example of a virtual antenna array formed using a radar system in an electronic device according to an embodiment.

For example, referring to FIG. 9, the processor 120 may transmit the first signal 812 through the first antenna 221 in the first time interval 810, and receive the first reflection signals 813 through the second antenna 222 to the fifth antenna 225 so that a first virtual antenna 910, a second virtual antenna 920, a third virtual antenna 930, and a fourth virtual antenna 940 in the virtual antenna array 900 are formed. The processor 120 may transmit the second signal 822 through the second antenna 222 in the second time interval 820 after the first time interval 810 and receive the second reflection signals 823 through the third antenna 223 to the fifth antenna 225 so that a fifth virtual antenna 950, a sixth virtual antenna 960, and a seventh virtual antenna 970 in the virtual antenna array 900 are formed.

Figure 10:
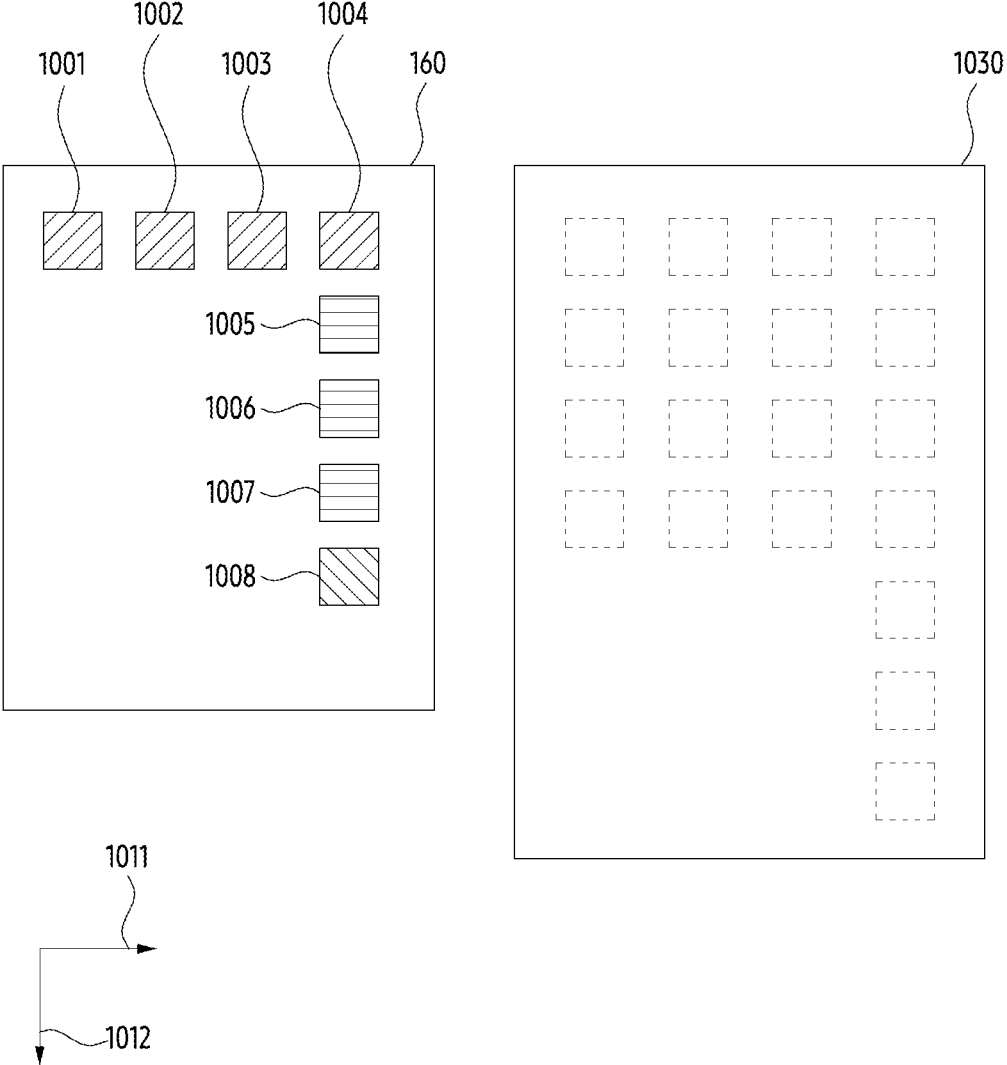
Figure 11:
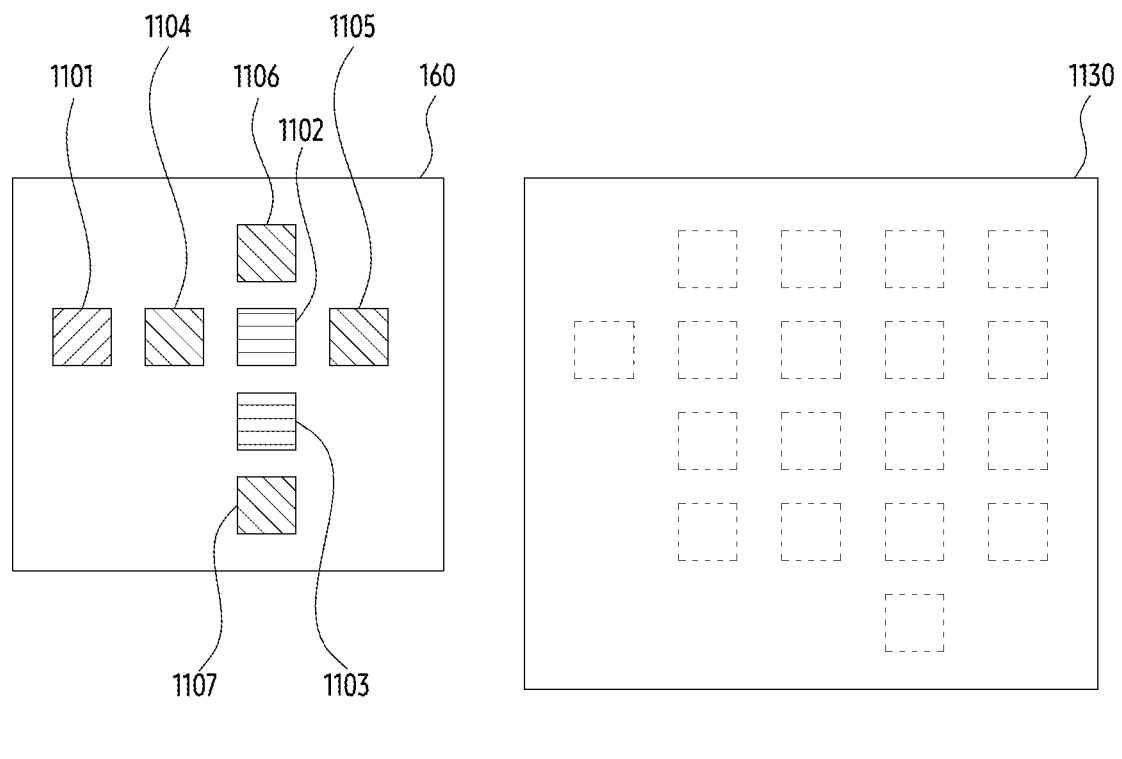
Figure 12:
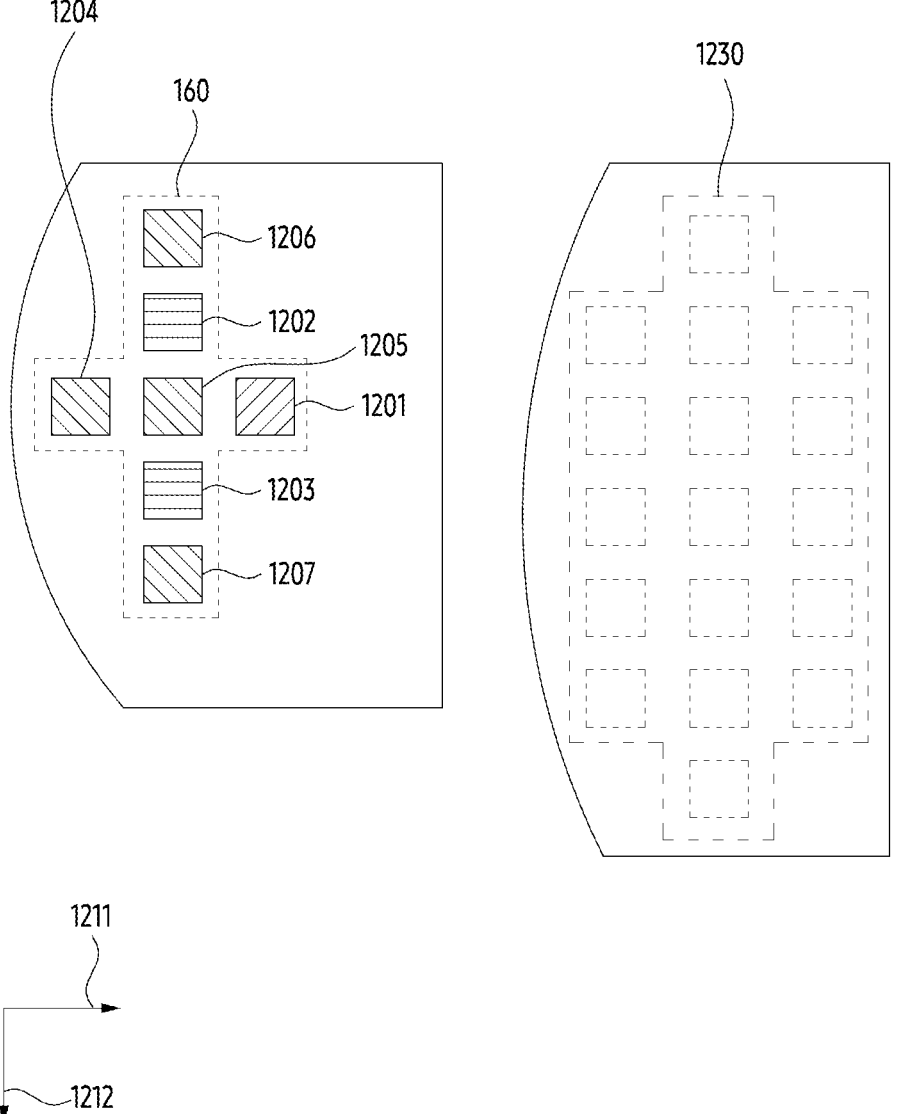

Referring back to FIG. 1, the electronic device 101 may include at least one antenna, such as the second antenna 222 electrically connected with the second Tx path 202 or the second Rx path 212 through the switch 230. For example, the electronic device 101 may include at least one antenna connectable with the Tx path or Rx path in the IC 150 through at least one switch in the IC 150, at least one antenna connected with at least one other Tx path in the IC 150, and at least one antenna connected with at least one other Rx path in the IC 150 in various arrangements, in order to form a virtual antenna array including virtual antennas in various arrangements. The various arrangements may be illustrated through the description of FIGS. 10 to 12. FIGS. 10 to 12 illustrate an example of a virtual antenna array formed using a radar system in an electronic device according to an embodiment.

For example, referring to FIG. 10, the electronic device 101 includes a first antenna 1001 to a fourth antenna 1004 in the antenna array 160 respectively connected to the first to fourth Tx paths in the IC 150, a fifth antenna 1005 to a seventh antenna 1007 in the antenna array 160 respectively connected to the first to third Rx paths in the IC 150, and an eighth antenna 1008 in the antenna array 160 connectable with a fifth Tx path or a fourth Rx path in the IC 150 through a switch in the IC 150. For example, the first antenna 1001 to the fourth antenna 1004 may be disposed in the first direction 1011 at the same interval, and the fourth antenna 1004 to the eighth antenna 1008 may be disposed in the second direction 1012 at the same interval. In an embodiment, while the eighth antenna 1008 is connected with the fourth Rx path through the switch, the processor 120 may transmit the first signal through the first antenna 1001 within the first time interval, receive the first reflection signals regarding the first signal transmitted through the fifth antenna 1005 to the eighth antenna 1008, transmit the second signal through the second antenna 1002 within the second time interval after the first time interval and receive the second reflection signals regarding the second signal transmitted through the fifth antenna 1005 to the eighth antenna 1008, transmit the third signal through the third antenna 1003 within the third time interval after the second time interval and receive the third reflection signals regarding the third signal transmitted through the fifth antenna 1005 to the eighth antenna 1008, transmit the fourth signal through the fourth antenna 1004 within the fourth time interval after the third time interval and receive the fourth reflection signals regarding the fourth signal transmitted through the fifth antenna 1005 to the eighth antenna 1008, transmit the fifth signal through the eighth antenna 1008 connected to the fifth Tx path through the switch within the fifth time interval after the fourth time interval, and receive fifth reflection signals regarding the fifth signal transmitted through the fifth antenna 1005 to the seventh antenna 1007. For example, a virtual antenna array 1030 may be formed based on the transmission and reception within the first time interval, the transmission and reception within the second time interval, the transmission and reception within the third time interval, the transmission and reception within the fourth time interval, and the transmission and the reception within the fifth time interval. For example, since the virtual antenna array 1030 includes virtual antennas disposed in the first direction 1011 corresponding to the horizontal direction and the second direction 1012 corresponding to the vertical direction, the electronic device 101 may provide both a resolution for an azimuth angle and a resolution for an elevation angle using the antenna array 160 including the first antenna 1001 to the eighth antenna 1008. For example, since the electronic device 101 forms a virtual antenna array 1030 including 19 virtual antennas using the antenna array 160 including eight antennas (e.g., the first antenna 1001 to the eighth antenna 1008), the electronic device 101 may provide a greater signal-to-noise ratio (SNR).

For another example, referring to FIG. 11, the electronic device 101 may include a first antenna 1101 in the antenna array 160 connected with the first Tx path in the IC 150, a second antenna 1102 in the antenna array 160 connected with the first Rx path in the IC 150 and a third antenna 1103 in the antenna array 160 connected with the second Rx path, a fourth antenna 1104 connectable with the second Tx path or the third Rx path in the IC 150 through the first switch in the IC 150, a fifth antenna 1105 connectable with the third Tx path or the fourth Rx path in the IC 150 through the second switch in the IC 150, a sixth antenna 1106 connectable with the fourth Tx path or the fifth Rx path in the IC 150 through the third switch in the IC 150, and a seventh antenna 1107 connectable with the fifth Tx path or the sixth Rx path in the IC 150 through the fourth switch in the IC 150. For example, the first antenna 1101, the fourth antenna 1104, the second antenna 1102, and the fifth antenna 1105 are disposed in the first direction 1111 at the same interval, and the sixth antenna 1106, the second antenna 1102, the third antenna 1103, and the seventh antenna 1107 may be disposed in the second direction 1112 at the same interval. In an embodiment, the processor 120 may transmit a first signal through the first antenna 1101 within the first time interval and receive first reflection signals regarding the first signal through at least a part of other antennas in the antenna array 160, transmit a second signal through the fourth antenna 1104 connected with the second Tx path through the first switch within the second time interval after the first time interval and receive second reflection signals regarding the second signal through at least a part of the antennas other than the first antenna 1101 and the fourth antenna 1104 from among a plurality of antennas in the antenna array 160, transmit a third signal through the fifth antenna 1105 connected with the third Tx path through the second switch within the third time interval after the second time interval and receive third reflection signals regarding the third signal through at least a part of the antennas other than the first antenna 1101 and the fifth antenna 1105 from among the plurality of antennas, transmit a fourth signal through the sixth antenna 1106 connected with the fourth Tx path through the third switch within the fourth time interval after the third time interval and receive fourth reflection signals regarding the fourth signal through at least a part of the antennas other than the first antenna 1101 and the sixth antenna 1106 from among the plurality of antennas, and transmit a fifth signal through the seventh antenna 1107 connected with the fifth Tx path through the fourth switch within the fifth time interval after the fourth time interval and receive fifth reflection signals regarding the fifth signal through at least a part of other antennas other than the first antenna 1101 and the seventh antenna 1107 from among the plurality of antennas. For example, a virtual antenna array 1130 may be formed based on the transmission and the reception within the first time interval, the transmission and the reception within the second time interval, the transmission and the reception within the third time interval, the transmission and the reception within the fourth time interval, and the transmission and the reception within the fifth time interval. For example, since the virtual antenna array 1130 includes virtual antennas disposed in the first direction 1111 corresponding to the horizontal direction and the second direction 1112 corresponding to the vertical direction, the electronic device 101 may provide both resolution for an azimuth angle and resolution for an elevation angle using the antenna array 160 including the first antenna 1101 to the seventh antenna 1107. For example, since the electronic device 101 forms the virtual antenna array 1130 including 18 virtual antennas by using the antenna array 160 including seven antennas (e.g., a first antenna 1101 to a seventh antenna 1107), the electronic device 101 may provide a greater signal-to-noise ratio.

For another example, referring to FIG. 12, the electronic device 101 may include a first antenna 1201 in the antenna array 160 connected with the first Tx path in the IC 150, a second antenna 1202 in the antenna array 160 connected with the first Rx path in the IC 150 and a third antenna 1203 in the antenna array 160 connected with the second Rx path, a fourth antenna 1204 in the antenna array 160 connected with the second Tx path or the third Rx path in the IC 150 through the first switch in the IC 150, a fifth antenna 1205 in the antenna array 160 connected with the third Tx path or the fourth Rx path in the IC 150 through the second switch in the IC 150, a sixth antenna 1206 in the antenna array 160 connected with the fourth Tx path or the fifth Rx path in the IC 150 through the third switch in the IC 150, and a seventh antenna 1207 in the antenna array 160 connected with the fifth Tx path or the sixth Rx path in the IC 150 through the fourth switch in the IC 150. For example, the first antenna 1201 to the seventh antenna 1207 in the antenna array 160 may be included in the electronic device 101 in an arrangement corresponding to the shape (e.g., circular) of the display 140 of the electronic device 101 including the smart watch (e.g., smartwatch 651). For example, the fourth antenna 1204, the fifth antenna 1205, and the first antenna 1201 are disposed in the first direction 1211 at the same interval, and the sixth antenna 1206, the second antenna 1202, the fifth antenna 1205, the third antenna 1203, and the seventh antenna 1207 may be disposed in the second direction 1212 at the same interval. In an embodiment, the processor 120 may transmit a first signal through the first antenna 1201 within the first time interval and receive first reflection signals regarding the first signal through at least a part of other antennas within the antenna array 160, transmit a second signal through the fourth antenna 1204 connected with the second Tx path through the first switch within the second time interval after the first time interval and receive second reflection signals regarding the second signal through at least a part of the antennas other than the first antenna 1201 and the fourth antenna 1204 from among the plurality of antennas in the antenna array 160, transmit a third signal through the fifth antenna 1205 connected with the third Tx path through the second switch within the third time interval after the second time interval and receive third reflection signals regarding the third signal through at least a part of the antennas other than the first antenna 1201 and the fifth antenna 1205 from among the plurality of antennas, transmit a fourth signal through the sixth antenna 1206 connected with the fourth Tx path through the third switch within the fourth time interval after the third time interval and receive fourth reflection signals regarding the fourth signal through at least a part of the antennas other than the first antenna 1201 and the sixth antenna 1206 from among the plurality of antennas, and transmit a fifth signal through the seventh antenna 1207 connected with the fifth Tx path through the fourth switch within the fifth time interval after the fourth time interval and receive fifth reflection signals regarding the fifth signal through at least a part of other antennas other than the first antenna 1201 and the seventh antenna 1207 from among the plurality of antennas. For example, a virtual antenna array 1230 may be formed based on the transmission and the reception within the first time interval, the transmission and the reception within the second time interval, the transmission and the reception within the third time interval, the transmission and the reception within the fourth time interval, and the transmission and the reception within the fifth time interval. For example, since the virtual antenna array 1230 includes virtual antennas disposed in a first direction 1211 corresponding to the horizontal direction and a second direction 1212 corresponding to the vertical direction, the electronic device 101 may provide both resolution for an azimuth angle and resolution for an elevation angle using the antenna array 160 including the first antenna 1201 to the seventh antenna 1207. For example, since the electronic device 101 forms the virtual antenna array 1230 including 17 virtual antennas using the antenna array 160 including seven antennas (e.g., the first antenna 1201 to the seventh antenna 1207), the electronic device 101 may provide a greater signal-to-noise ratio. For example, the electronic device 101 may provide a greater signal-to-noise ratio by using seven antennas disposed to fit the shape of the display 140 within the electronic device 101.

Figure 13:
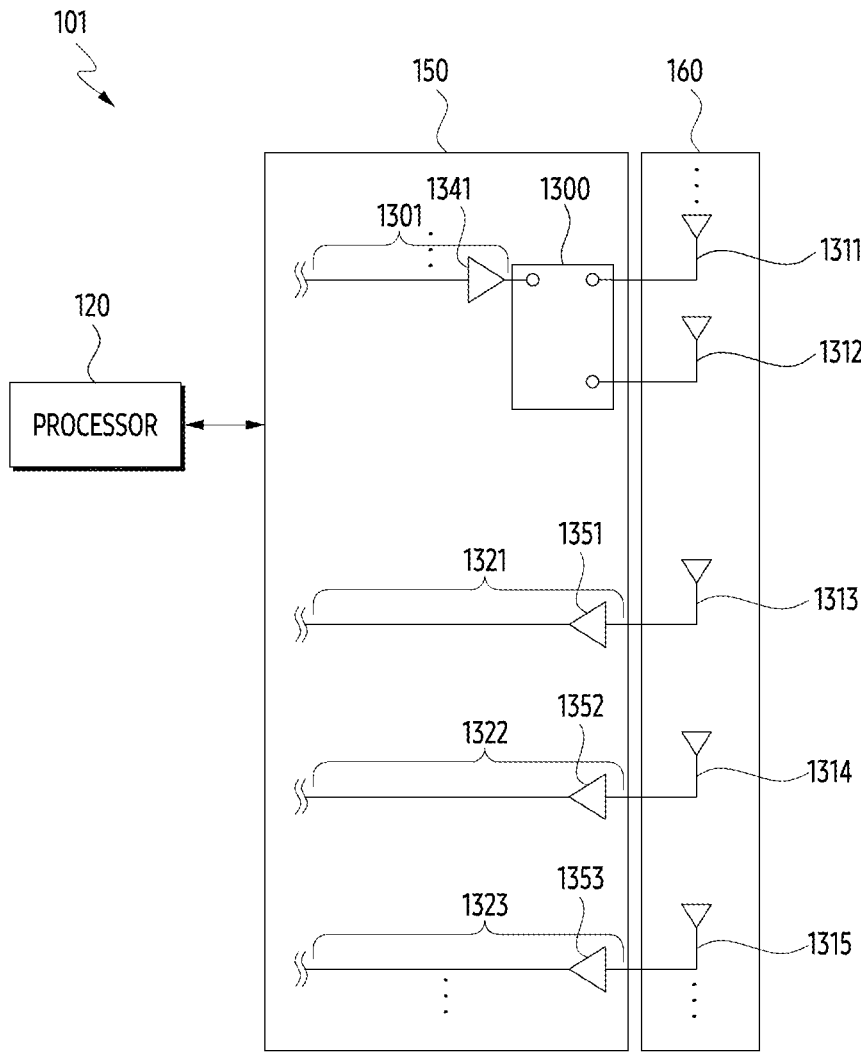
FIGS. 13 to 15 illustrate other examples of a configuration of a radar system in an electronic device according to an example embodiment.

Meanwhile, referring to FIG. 1, in an embodiment, the electronic device 101 may include a switch for reducing the number of Tx paths in the IC 150. For example, the switch may be illustrated through the description of FIG. 13. FIG. 13 illustrates other examples of a configuration of a radar system in an electronic device according to an embodiment.

For example, referring to FIG. 13, the electronic device 101 may include an IC 150 including a switch 1300, a Tx path 1301 electrically connectable with a first antenna 1311 or a second antenna 1312 through the switch 1300, a first Rx path 1321 electrically connected with the third antenna 1313, a second Rx path 1322 electrically connected with the fourth antenna 1314, and the third Rx path 1323 electrically connected with the fifth antenna 1315, and an antenna array 160 including the first antenna 1311, the second antenna 1312, the third antenna 1313, the fourth antenna 1314, and the fifth antenna 1315. In an embodiment, the Tx path 1301 may include a PA 1341 for setting Tx power of a first signal transmitted through the first antenna 1311, or Tx power of a second signal transmitted through the second antenna 1312. In an embodiment, the first Rx path 1321 may include a first LNA 1351 for amplifying the power of signals (e.g., first reflection signals regarding the first signal and second reflection signals regarding the second signal) received through the third antenna 1313. Although not shown in FIG. 13, the first Rx path 1321 may further include a first mixer and a first filter. However, it is not limited thereto. In an embodiment, the second Rx path 1322 may include a second LNA 1352 for amplifying the power of signals (e.g., first reflection signals regarding the first signal and second reflection signals regarding the second signal) received through the fourth antenna 1314. Although not shown in FIG. 13, the second Rx path 1322 may further include a second mixer and a second filter. However, it is not limited thereto. In an embodiment, the third Rx path 1323 may include a third LNA 1353 for amplifying the power of signals (e.g., first reflection signals regarding the first signal and second reflection signals regarding the second signal) received through the fifth antenna 1315. Although not shown in FIG. 13, the third Rx path 1323 may further include a third mixer and a third filter. However, it is not limited thereto.

In an embodiment, the processor 120 may transmit the first signal through the first antenna 1311 electrically connected with the Tx path 1301 through the switch 1300, within the first time interval (e.g., the first frame). The processor 120 may receive the first reflection signals that the first signal is reflected from the external object around the electronic device 101 through the third antenna 1313 to fifth antenna 1315, within the first time interval. For example, the processor 120 may receive the first reflection signals regarding the first signal transmitted through the first antenna 1311 through the third antenna 1313 to the fifth antenna 1315, so that three virtual antennas are formed.

In an embodiment, the processor 120 may transmit the second signal through the second antenna 1312 electrically connected with the Tx path 1301 through the switch 1300, within the second time interval (e.g., the second frame). The processor 120 may receive the second reflection signals that the second signal is reflected from the external object around the electronic device 101 through the third antenna 1313 to the fifth antenna 1315, within the second time interval. For example, the processor 120 may receive the second reflection signals regarding the second signal transmitted through the second antenna 1312, through the third antenna 1313 to the fifth antenna 1315 so that three virtual antennas distinct from the three virtual antennas formed within the first time interval are formed.

In an embodiment, the processor 120 may obtain the first data, the second data, and/or the third data based on the first reflection signals and the second reflection signals.

Meanwhile, referring to FIG. 1, in an embodiment, the electronic device 101 may include a switch for reducing the number of Rx paths in the IC 150. For example, the switch may be illustrated through the description of FIG. 14.

Figure 14:
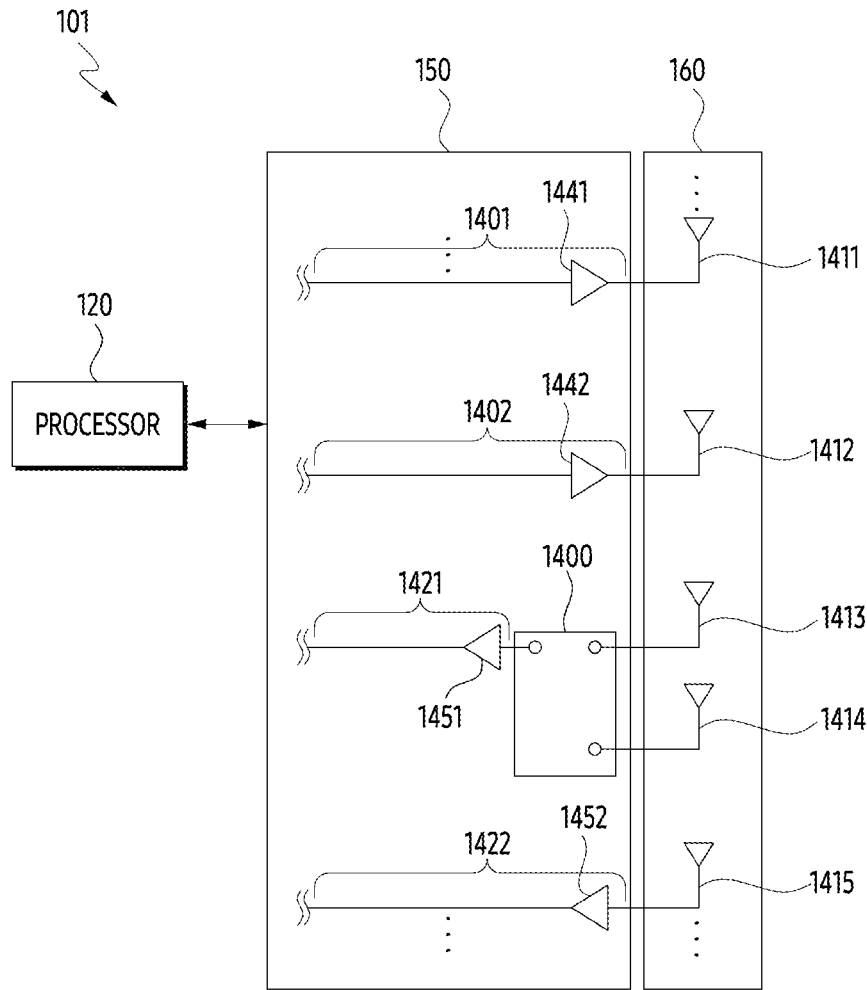

FIG. 14 illustrates other examples of a configuration of a radar system in an electronic device according to an embodiment.

For example, referring to FIG. 14, the electronic device 101 may include an IC 150 including a switch 1400, a first Tx path 1401 electrically connected with a first antenna 1411, a second Tx path 1402 electrically connected with a second antenna 1412, a first Rx path 1421 electrically connectable with a third antenna 1413 or a fourth antenna 1414 through the switch 1400, and a second Rx path 1422 electrically connected with a fifth antenna 1415, and an antenna array 160 including the first antenna 1411, the second antenna 1412, the third antenna 1413, the fourth antenna 1414 and the fifth antenna 1415. In an embodiment, the Tx path 1401 may include a first PA 1441 for setting the Tx power of the first signal transmitted through the first antenna 1411. In an embodiment, the Tx path 1402 may include a second PA 1442 for setting the Tx power of the second signal transmitted through the second antenna 1412. In an embodiment, the first Rx path 1421 may include a first LNA 1451 for amplifying the power of signals (e.g., first reflection signals regarding the first signal and/or second reflection signals regarding the second signal) received through the third antenna 1413 or the fourth antenna 1414. Although not shown in FIG. 14, the first Rx path 1421 may further include a first mixer and a first filter. However, it is not limited thereto. In an embodiment, the second Rx path 1422 may include a second LNA 1452 for amplifying the power of signals (e.g., first reflection signals regarding the first signal and second reflection signals regarding the second signal) received through the fifth antenna 1415. Although not shown in FIG. 14, the second Rx path 1422 may further include a second mixer and a second filter. However, it is not limited thereto.

In an embodiment, the processor 120 may transmit the first signal through the first antenna 1411 within a first time interval (e.g., first frame). The processor 120 may receive the first reflection signals that the first signal is reflected from the external object around the electronic device 101, through the third antenna 1413 electrically connected with the first Rx path 1421 through the switch 1400 and the fifth antenna 1415, within the first time interval. For example, the processor 120 may receive the first reflection signals regarding the first signal transmitted through the first antenna 1411, through the third antenna 1413 and the fifth antenna 1415, so that for example two virtual antennas may be formed.

In an embodiment, the processor 120 may transmit the second signal through the second antenna 1412 within a second time interval (e.g., second frame). The processor 120 may receive the second reflection signals that the second signal is reflected from the external object around the electronic device 101, through the fourth antenna 1414 electrically connected with the first Rx path 1421 through the switch 1400 and the fifth antenna 1415, within the second time interval. For example, the processor 120 may receive the second reflection signals regarding the second signal transmitted through the second antenna 1412, through the fourth antenna 1414 and the fifth antenna 1415, so that two virtual antennas distinct from the two virtual antennas formed within the first time interval are formed.

In an embodiment, the processor 120 may obtain the first data, the second data, and/or the third data based on the first reflection signals and the second reflection signals.

Figure 15:
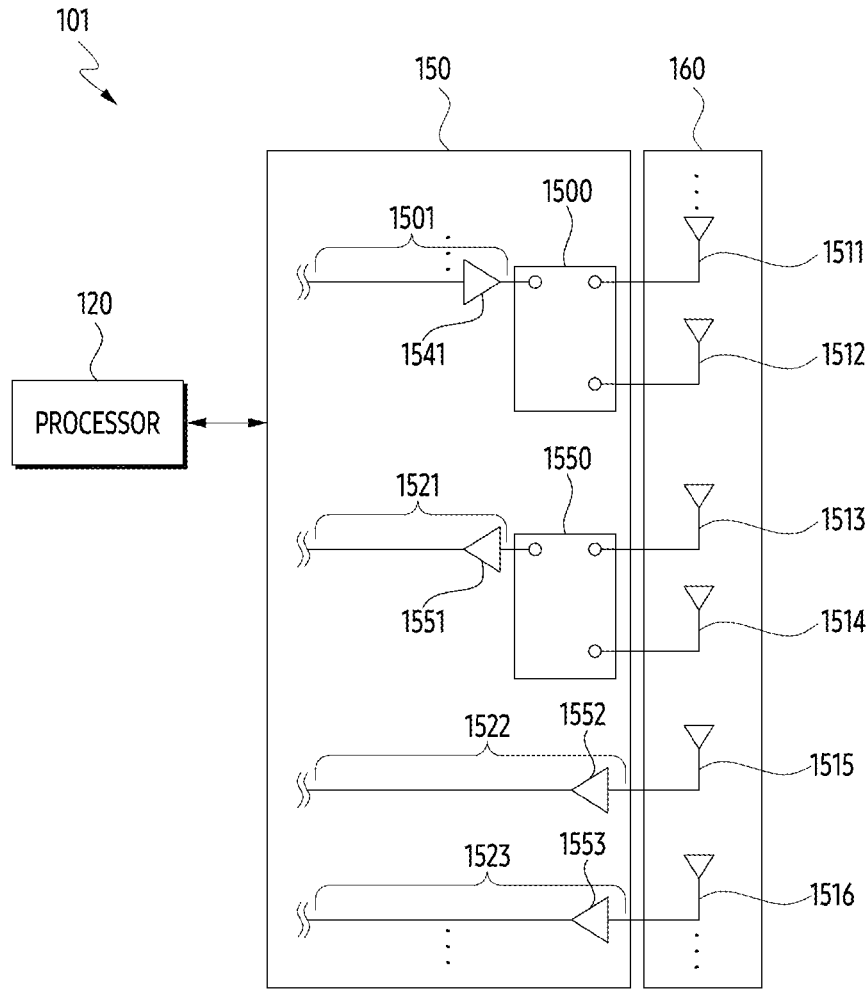

Meanwhile, referring to FIG. 1, in an embodiment, the electronic device 101 may include a plurality of switches for reducing the number of Tx paths in the IC 150 and the number of Rx paths in the IC 150. For example, the plurality of switches may be illustrated through the description of FIG. 15. FIG. 15 illustrates other examples of configurations of a radar system in an electronic device according to an embodiment.

For example, referring to FIG. 15, the electronic device 101 may include an IC 150 including a first switch 1500, a second switch 1550, a Tx path 1501 electrically connectable with the first antenna 1511 or the second antenna 1512 through the first switch 1500, a first Rx path 1521 electrically connectable with a third antenna 1513 or a fourth antenna 1514 through the second switch 1550, a second Rx path 1522 electrically connected with a fifth antenna 1515, and a third Rx path 1523 electrically connected with a sixth antenna 1516, and an antenna array 160 including the first antenna 1511, the second antenna 1512, the third antenna 1513, the fourth antenna 1514, the fifth antenna 1515, and the sixth antenna 1516. Although not shown in FIG. 15, the first Rx path 1521 may further include a first mixer and a first filter. However, it is not limited thereto. In an embodiment, the second Rx path 1522 may include a second LNA 1552 for amplifying the power of signals (e.g., the first reflection signals and the second reflection signals) received through the fifth antenna 1515. Although not shown in FIG. 15, the second Rx path 1522 may further include a second mixer and a second filter. However, it is not limited thereto. In an embodiment, the third Rx path 1523 may include a third LNA 1553 for amplifying the power of signals (e.g., the first reflection signals and the second reflection signals) received through the sixth antenna 1516. Although not shown in FIG. 15, the third Rx path 1523 may further include a third mixer and a third filter. However, it is not limited thereto.

In an embodiment, the processor 120 may transmit the first signal through the first antenna 1511 electrically connected with the Tx path 1501 through the first switch 1500, within the first time interval (e.g., the first frame). The processor 120 may receive the first reflection signals that the first signal is reflected from the external object around the electronic device 101 through the third antenna 1513 electrically connected with the first Rx path 1521 through the second switch 1550, the fifth antenna 1515 electrically connected with the second Rx path 1522, and the sixth antenna 1516 electrically connected with the third Rx path 1523, within the first time interval. For example, the processor 120 may receive the first reflection signals regarding the first signal transmitted through the first antenna 1511 through the third antenna 1513, the fifth antenna 1515, and the sixth antenna 1516 so that three virtual antennas are formed. For example, referring to FIG. 16, the processor 120 may transmit the first signals through the first antenna 1511 within the first time interval and receive the first reflection signals through the third antenna 1513, the fifth antenna 1515, and the sixth antenna 1516, so that the first virtual antennas 1610 in the virtual antenna array 1600 are formed.

Figure 16:
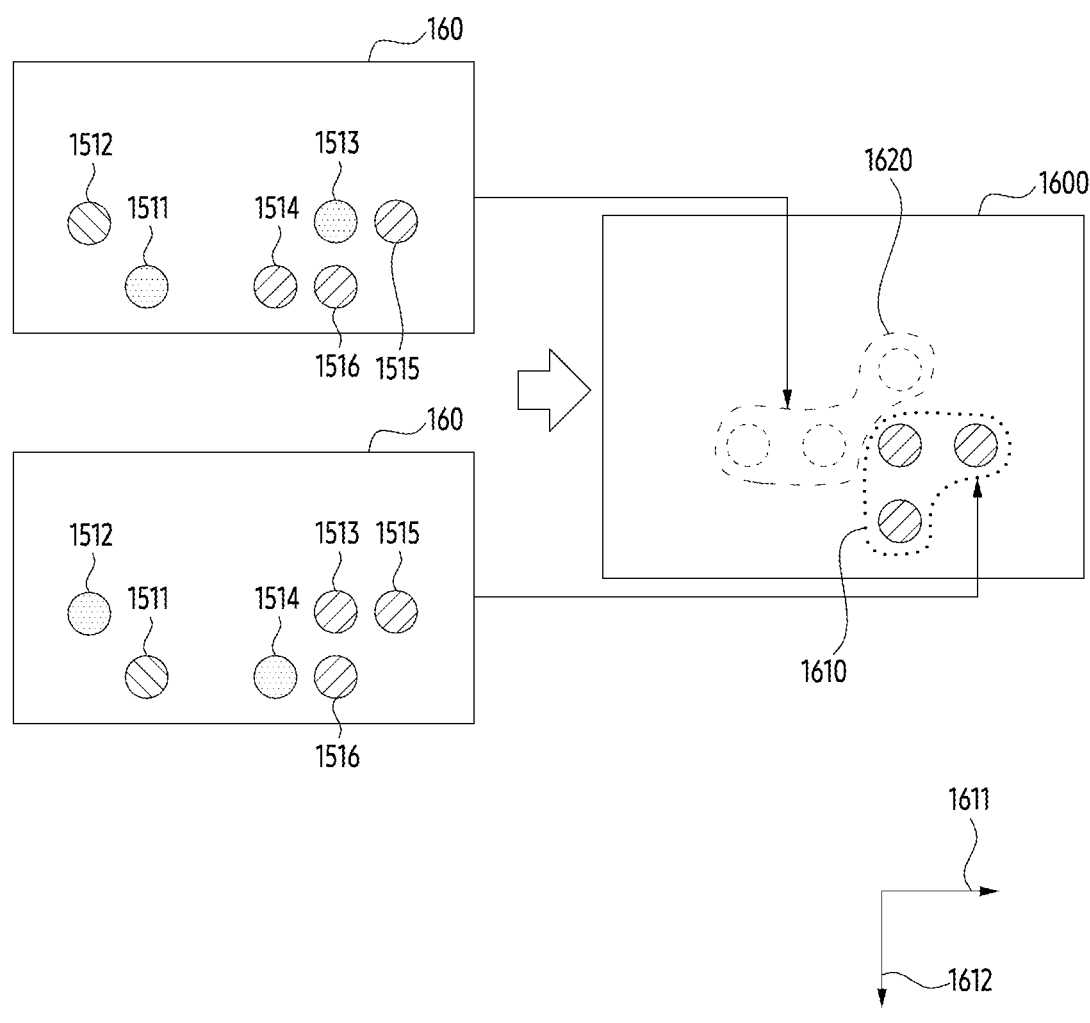
FIG. 16 illustrates another example of a virtual antenna array formed using a radar system in an electronic device according to an example embodiment.

Referring to FIG. 15, the processor 120 may transmit the second signal through the second antenna 1512 electrically connected with the Tx path 1501 through the first switch 1500 within the second time interval (e.g., the second frame). The processor 120 may receive the second reflection signals that the second signal is reflected from the external object around the electronic device 101 through the fourth antenna 1514 electrically connected with the first Rx path 1521 through the second switch 1550, the fifth antenna 1515 electrically connected with the second Rx path 1522, and the sixth antenna 1516 electrically connected with the third Rx path 1523, within the second time interval. For example, the processor 120 may receive the second reflection signals regarding the second signal transmitted through the second antenna 1512, through the fourth antenna 1514, the fifth antenna 1515, and the sixth antenna 1516, so that three virtual antennas distinct from the three virtual antennas formed within the first time interval are formed. For example, a virtual antenna array formed through the first antenna 1511 to the sixth antenna 1516 may be illustrated through the description of FIG. 16. FIG. 16 illustrates another example of a virtual antenna array formed using a radar system in an electronic device according to an embodiment.

For example, referring to FIG. 16, the processor 120 may transmit the second signals through the second antenna 1512 within the second time interval and receive the second reflection signals through the fourth antenna 1514, the fifth antenna 1515, and the sixth antenna 1516 so that second virtual antennas 1620 in the virtual antenna array 1600 are formed.

For example, since the virtual antenna array 1600 including the first virtual antennas 1610 and the second virtual antennas 1620 includes virtual antennas disposed in the first direction 1611 corresponding to the horizontal direction and the second direction 1612 corresponding to the vertical direction, the electronic device 101 may provide both resolution for an azimuth angle and resolution for an elevation angle using the antenna array 160 including the first antenna 1511 to the sixth antenna 1516. For example, the electronic device 101 may provide both resolution for the azimuth angle and resolution for the elevation angle by using the IC 150 having a reduced size by including the first switch 1500 and the second switch 1550, and the antenna array 160 including a first antenna 1511 to a sixth antenna 1516 operatively coupled.

Figure 17:
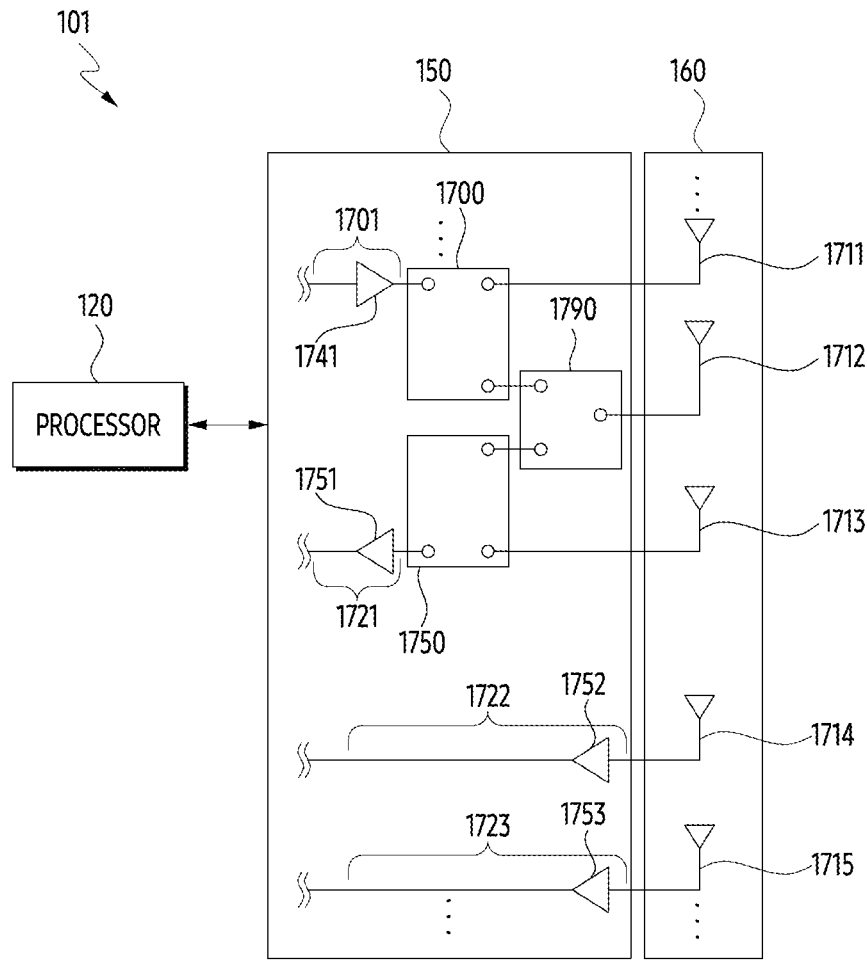
FIG. 17 illustrates another example of a configuration of a radar system in an electronic device according to an example embodiment.

Meanwhile, referring back to FIG. 1, in an embodiment, the electronic device 101 may include a plurality of switches for reducing the number of Tx paths in the IC 150, the number of Rx paths in the IC 150, and the number of antennas in the antenna array 160. For example, the plurality of switches may be illustrated through the description of FIG. 17. FIG. 17 illustrates another example of a configuration of a radar system in an electronic device according to an embodiment.

For example, referring to FIG. 17, the electronic device 101 may include an IC 150 including a first switch 1700, a second switch 1750, a third switch 1790, a Tx path 1701 electrically connected with the first antenna 1711 through the first switch 1700 or electrically connected with the second antenna 1712 through the first switch 1700 and the third switch 1790, a first Rx path 1721 electrically connected with the second antenna 1712 through a second switch 1750 and a third switch 1790 or electrically connected with a third antenna through the second switch 1750, a second Rx path 1722 electrically connected with a fourth antenna 1714, and a third Rx path 1723 electrically connected with a fifth antenna 1715, and an antenna array 160 including the first antenna 1711, the second antenna 1712, the third antenna 1713, the fourth antenna 1714, and the fifth antenna 1715. In an embodiment, the Tx path 1701 may include a PA 1741 for setting the Tx power of a first signal transmitted through the first antenna 1711 or a second signal transmitted through the second antenna 1712. In an embodiment, the first Rx path 1721 may include a first LNA 1751 for amplifying the power of signals (e.g., first reflection signals regarding the first signal or second reflection signals regarding the second signal) received through the second antenna 1712 or the third antenna 1713. Although not shown in FIG. 17, the first Rx path 1721 may further include a first mixer and a first filter. However, it is not limited thereto. In an embodiment, the second Rx path 1722 may include a second LNA 1752 for amplifying the power of signals (e.g., the first reflection signals and the second reflection signals) received through the fourth antenna 1714. Although not shown in FIG. 17, the second Rx path 1722 may further include a second mixer and a second filter. However, it is not limited thereto. In an embodiment, the third Rx path 1723 may include a third LNA 1753 for amplifying the power of signals (e.g., the first reflection signals and the second reflection signals) received through the fifth antenna 1715. Although not shown in FIG. 17, the third Rx path 1723 may further include a third mixer and a third filter. However, it is not limited thereto.

Figure 18:
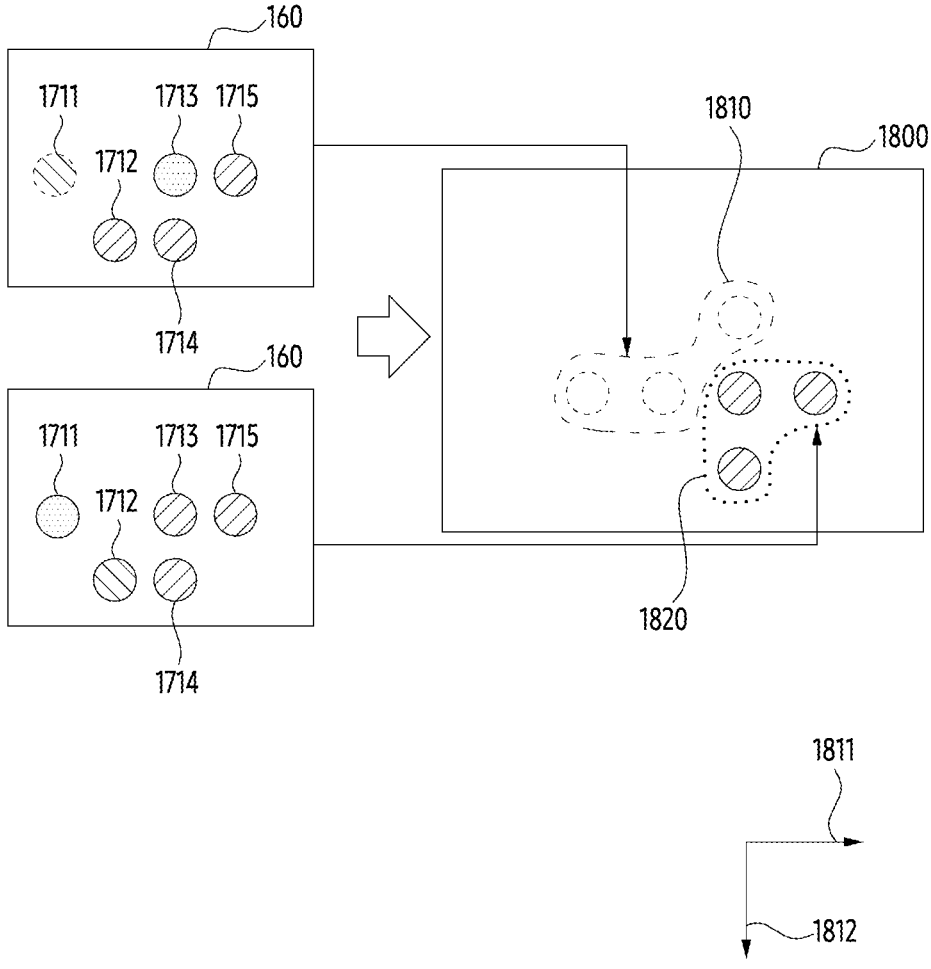
FIG. 18 illustrates another example of a virtual antenna array formed using a radar system in an electronic device according to an example embodiment.

In an embodiment, the processor 120 may transmit the first signal through the first antenna 1711 electrically connected with the Tx path 1701 through the first switch 1700 Within the first time interval (e.g., the first frame). The processor 120 may receive the first reflection signals that the first signal is reflected from the external object around the electronic device 101 through a second antenna 1712 electrically connected with the first Rx path 1721 through the second switch 1750 and the third switch 1790, a fourth antenna 1714 electrically connected with the second Rx path 1722 and a fifth antenna 1715 electrically connected with the third Rx path 1723, within the first time interval. For example, the processor 120 may receive the first reflection signals regarding the first signal transmitted through the first antenna 1711, through the second antenna 1712, the fourth antenna 1714, and the fifth antenna 1715 so that three virtual antennas are formed. For example, a virtual antenna array formed through the first antenna 1711 to the fifth antenna 1715 may be illustrated through the description of FIG. 18. FIG. 18 illustrates another example of a virtual antenna array formed using a radar system in an electronic device according to an embodiment.

For example, referring to FIG. 18, the processor 120 may transmit the first signals through the first antenna 1711 within the first time interval and receive the first reflection signals through the second antenna 1712, the fourth antenna 1714, and the fifth antenna 1715 so that first virtual antennas 1810 in the virtual antenna array 1800 are formed.

Referring to FIG. 17, the processor 120 may transmit the second signal through a second antenna 1712 electrically connected with the Tx path 1701 through the first switch 1700 and the third switch 1790 within the second time interval (e.g., the second frame). The processor 120 may receive the second reflection signals that the second signal is reflected from the external object around the electronic device 101, through the third antenna 1713 electrically connected with the first Rx path 1721 through the second switch 1750, the fourth antenna 1714 electrically connected with the second Rx path 1722, and the fifth antenna 1715 electrically connected with the third Rx path 1723, within the second time interval. For example, the processor 120 may receive the second reflection signals regarding the second signal transmitted through the second antenna 1712, through the third antenna 1713, the fourth antenna 1714, and the fifth antenna 1715 so that three virtual antennas distinct from the three virtual antennas formed within the first time interval are formed. For example, referring to FIG. 18, the processor 120 may transmit the second signals through the second antenna 1712 within the second time interval and receive the second reflection signals through the third antenna 1713, the fourth antenna 1714, and the fifth antenna 1715 so that second virtual antennas 1820 in the virtual antenna array 1800 are formed.

For example, since the virtual antenna array 1800 including the first virtual antennas 1810 and the second virtual antennas 1820 includes virtual antennas disposed in the first direction 1811 corresponding to the horizontal direction and the second direction 1812 corresponding to the vertical direction, the electronic device 101 may provide both resolution for an azimuth angle and resolution for an elevation angle using the antenna array 160 including the first antenna 1711 to the fifth antenna 1715. For example, the electronic device 101 may provide both resolution for the azimuth angle and resolution for the elevation angle using the IC 150 having a reduced size by including the first switch 1700, the second switch 1750, and the third switch 1790, and the antenna array 160 including first antennas 1711 through fifth antennas 1715 operatively coupled.

Figure 19:
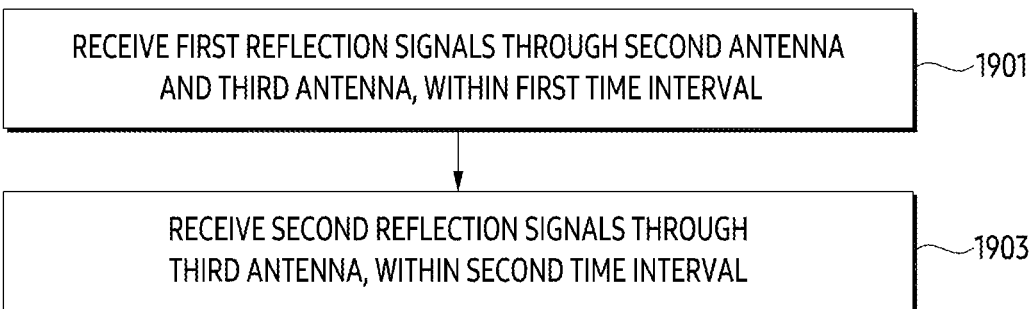
FIG. 19 illustrates an exemplary method of receiving reflection signals regarding signal transmitted from a radar system by adaptively switching a path connected with an antenna according to an example embodiment.

FIG. 19 illustrates an exemplary method of receiving reflection signals regarding signal transmitted from a radar system by adaptively switching a path connected to an antenna according to an embodiment. This method may be performed by the electronic device 101 illustrated in FIG. 1, the electronic device 101 illustrated in FIG. 2, and the processor 120 of the electronic device 101 illustrated in FIG. 1 or 2.

Referring to FIG. 19, in operation 1901, the processor 120 may receive first reflection signals regarding the first signal transmitted through the first antenna 221 electrically connected with the first Tx path 201 in the IC 150 in the electronic device 101, through the second antenna 222 electrically connected with the second Rx path 212 in the IC 150 through the switch 230 in the IC 150, and the third antenna 223 electrically connected with the first Rx path 211 in the IC 150, within the first time interval. In an embodiment, the third antenna 223 may be disposed between the first antenna 221 and the second antenna 222 to secure a distance between the first antenna 221 and the second antenna 222. In an embodiment, the processor 120 may transmit the first signal through the first antenna 221 within the first time interval based on turning on the first PA 241 in the first Tx path 201, and receive the first reflection signals through the second antenna 222 and the third antenna 223 within the first time interval.

In operation 1903, the processor 120 may receive second reflection signals regarding the second signal transmitted through the second antenna 222 connected, directly or indirectly, through the switch 230 and the second Tx path 202 in the IC 150 in the electronic device 101, through the third antenna 223 electrically connected, directly or indirectly, with the first Rx path 211, within a second time interval different from the first time interval. In an embodiment, the processor 120 may control the switch 230 to electrically disconnect the second Rx path 212 from the second antenna 222 and to electrically connect the second Tx path 202 to the second antenna 222, in response to the reception of the first reflection signals within the first time interval. In an embodiment, the processor 120 may turn on the second PA 242 in the second Tx path 202 based on the controlling of the switch 230. The processor 120 may transmit the second signal through the second antenna 222, within the second time interval, in response to turning on the second PA 242, and receive the second reflection signals through the third antenna 223 within the second time interval.

Although not shown in FIG. 19, the processor 120 may obtain information on an external object around the electronic device 101 based on the first reflection signals and the second reflection signals. For example, the information may include first data on relative location relation between the electronic device and an external object around the electronic device, second data on movement of the external object, and/or third data on posture of the external object. In an embodiment, the information may be used to identify a user input for the electronic device 101. For example, the information may be used to identify or recognize gestures caused by a user's hand located within the coverage of the radar system (e.g., radar system 145). However, it is not limited thereto.

Figure 20:
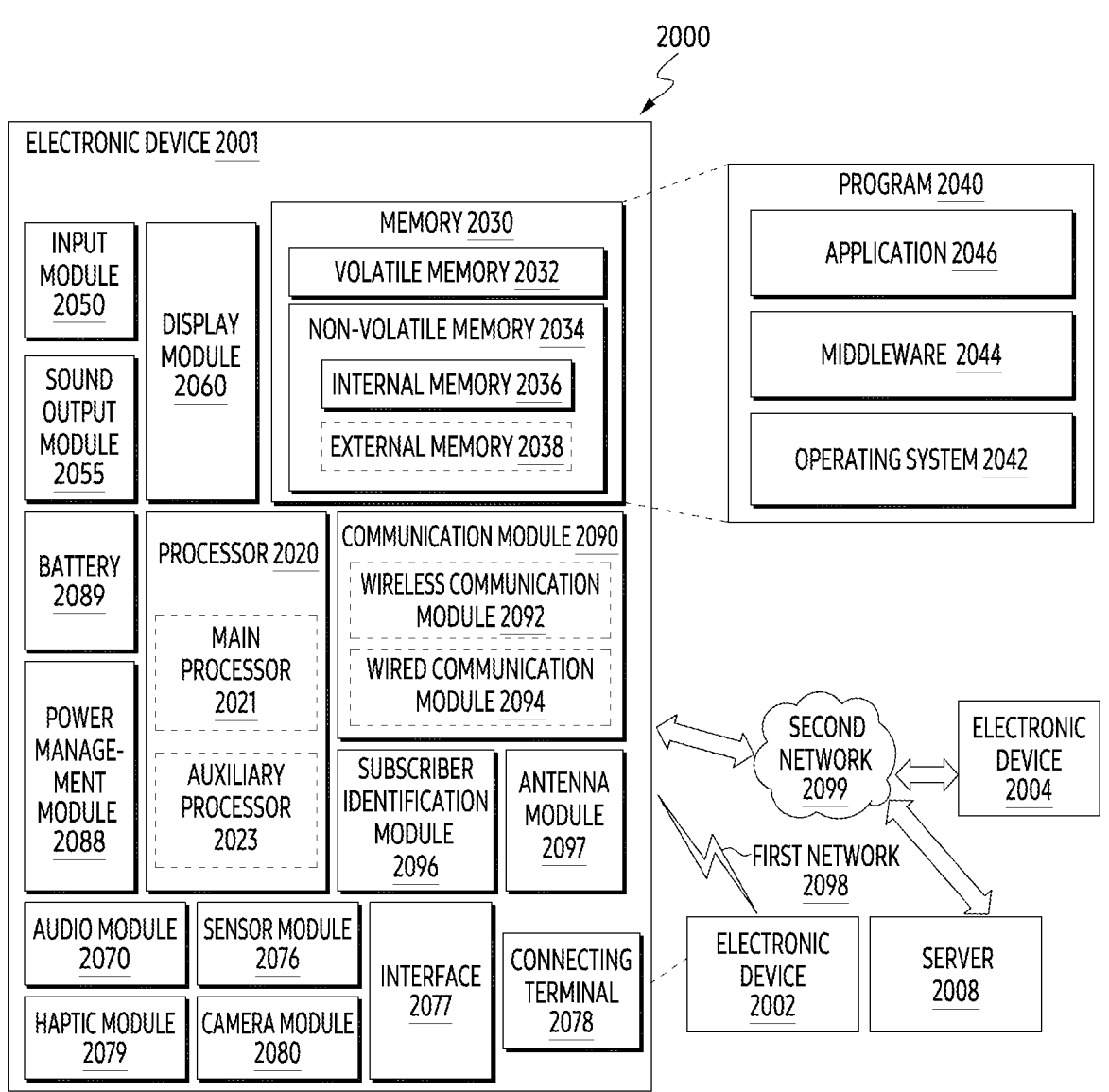
FIG. 20 is a block diagram of an electronic device in a network environment according to various example embodiments.

FIG. 20 is a block diagram illustrating an electronic device 2001 in a network environment 2000 according to various embodiments. The electronic device 2001 may be an example of the electronic device 101 illustrated in FIGS. 1, 2, 5, 13 to 15, and 17.

Referring to FIG. 20, the electronic device 2001 in the network environment 2000 may communicate with an electronic device 2002 via a first network 2098 (e.g., a short-range wireless communication network), or at least one of an electronic device 2004 or a server 2008 via a second network 2099 (e.g., a long-range wireless communication network). According to an embodiment, the electronic device 2001 may communicate with the electronic device 2004 via the server 2008. According to an embodiment, the electronic device 2001 may include a processor 2020, memory 2030, an input module 2050, a sound output module 2055, a display module 2060, an audio module 2070, a sensor module 2076, an interface 2077, a connecting terminal 2078, a haptic module 2079, a camera module 2080, a power management module 2088, a battery 2089, a communication module 2090, a subscriber identification module (SIM) 2096, or an antenna module 2097. In some embodiments, at least one of the components (e.g., the connecting terminal 2078) may be omitted from the electronic device 2001, or one or more other components may be added in the electronic device 2001. In some embodiments, some of the components (e.g., the sensor module 2076, the camera module 2080, or the antenna module 2097) may be implemented as a single component (e.g., the display module 2060).

The processor 2020 may execute, for example, software (e.g., a program 2040) to control at least one other component (e.g., a hardware or software component) of the electronic device 2001 coupled with the processor 2020, and may perform various data processing or computation. According to one embodiment, as at least part of the data processing or computation, the processor 2020 may store a command or data received from another component (e.g., the sensor module 2076 or the communication module 2090) in volatile memory 2032, process the command or the data stored in the volatile memory 2032, and store resulting data in non-volatile memory 2034. According to an embodiment, the processor 2020 may include a main processor 2021 (e.g., a central processing unit (CPU) or an application processor (AP)), or an auxiliary processor 2023 (e.g., a graphics processing unit (GPU), a neural processing unit (NPU), an image signal processor (ISP), a sensor hub processor, or a communication processor (CP)) that is operable independently from, or in conjunction with, the main processor 2021. For example, when the electronic device 2001 includes the main processor 2021 and the auxiliary processor 2023, the auxiliary processor 2023 may be adapted to consume less power than the main processor 2021, or to be specific to a specified function. The auxiliary processor 2023 may be implemented as separate from, or as part of the main processor 2021.

The auxiliary processor 2023 may control at least some of functions or states related to at least one component (e.g., the display module 2060, the sensor module 2076, or the communication module 2090) among the components of the electronic device 2001, instead of the main processor 2021 while the main processor 2021 is in an inactive (e.g., sleep) state, or together with the main processor 2021 while the main processor 2021 is in an active state (e.g., executing an application). According to an embodiment, the auxiliary processor 2023 (e.g., an image signal processor or a communication processor) may be implemented as part of another component (e.g., the camera module 2080 or the communication module 2090) functionally related to the auxiliary processor 2023. According to an embodiment, the auxiliary processor 2023 (e.g., the neural processing unit) may include a hardware structure specified for artificial intelligence model processing. An artificial intelligence model may be generated by machine learning. Such learning may be performed, e.g., by the electronic device 2001 where the artificial intelligence is performed or via a separate server (e.g., the server 2008). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 2030 may store various data used by at least one component (e.g., the processor 2020 or the sensor module 2076) of the electronic device 2001. The various data may include, for example, software (e.g., the program 2040) and input data or output data for a command related thereto. The memory 2030 may include the volatile memory 2032 or the non-volatile memory 2034. Each "processor" herein comprises processing circuitry.

The program 2040 may be stored in the memory 2030 as software, and may include, for example, an operating system (OS) 2042, middleware 2044, or an application 2046.

The input module 2050 may receive a command or data to be used by another component (e.g., the processor 2020) of the electronic device 2001, from the outside (e.g., a user) of the electronic device 2001. The input module 2050 may include, for example, a microphone, a mouse, a keyboard, a key (e.g., a button), or a digital pen (e.g., a stylus pen).

The sound output module 2055 may output sound signals to the outside of the electronic device 2001. The sound output module 2055 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 2060 may visually provide information to the outside (e.g., a user) of the electronic device 2001.

The display module 2060 may include, for example, a display, a hologram device, or a projector and control circuitry to control a corresponding one of the display, hologram device, and projector. According to an embodiment, the display module 2060 may include a touch sensor adapted to detect a touch, or a pressure sensor adapted to measure the intensity of force incurred by the touch.

The audio module 2070 may convert a sound into an electrical signal and vice versa. According to an embodiment, the audio module 2070 may obtain the sound via the input module 2050, or output the sound via the sound output module 2055 or a headphone of an external electronic device (e.g., an electronic device 2002) directly (e.g., wiredly) or wirelessly coupled with the electronic device 2001.

The sensor module 2076 may detect an operational state (e.g., power or temperature) of the electronic device 2001 or an environmental state (e.g., a state of a user) external to the electronic device 2001, and then generate an electrical signal or data value corresponding to the detected state. According to an embodiment, the sensor module 2076 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 2077 may support one or more specified protocols to be used for the electronic device 2001 to be coupled with the external electronic device (e.g., the electronic device 2002) directly (e.g., wiredly) or wirelessly. According to an embodiment, the interface 2077 may include, for example, a high definition multimedia interface (HDMI), a universal serial bus (USB) interface, a secure digital (SD) card interface, or an audio interface.

A connecting terminal 2078 may include a connector via which the electronic device 2001 may be physically connected with the external electronic device (e.g., the electronic device 2002). According to an embodiment, the connecting terminal 2078 may include, for example, a HDMI connector, a USB connector, a SD card connector, or an audio connector (e.g., a headphone connector).

The haptic module 2079 may convert an electrical signal into a mechanical stimulus (e.g., a vibration or a movement) or electrical stimulus which may be recognized by a user via his tactile sensation or kinesthetic sensation. According to an embodiment, the haptic module 2079 may include, for example, a motor, a piezoelectric element, or an electric stimulator.

The camera module 2080 may capture a still image or moving images. According to an embodiment, the camera module 2080 may include one or more lenses, image sensors, image signal processors, or flashes.

The power management module 2088 may manage power supplied to the electronic device 2001. According to one embodiment, the power management module 2088 may be implemented as at least part of, for example, a power management integrated circuit (PMIC).

The battery 2089 may supply power to at least one component of the electronic device 2001. According to an embodiment, the battery 2089 may include, for example, a primary cell which is not rechargeable, a secondary cell which is rechargeable, or a fuel cell.

The communication module 2090 may support establishing a direct (e.g., wired) communication channel or a wireless communication channel between the electronic device 2001 and the external electronic device (e.g., the electronic device 2002, the electronic device 2004, or the server 2008) and performing communication via the established communication channel. The communication module 2090 may include one or more communication processors that are operable independently from the processor 2020 (e.g., the application processor (AP)) and supports a direct (e.g., wired) communication or a wireless communication. According to an embodiment, the communication module 2090 may include a wireless communication module 2092 (e.g., a cellular communication module, a short-range wireless communication module, or a global navigation satellite system (GNSS) communication module) or a wired communication module 2094 (e.g., a local area network (LAN) communication module or a power line communication (PLC) module). A corresponding one of these communication modules may communicate with the external electronic device via the first network 2098 (e.g., a short-range communication network, such as Bluetooth™, wireless-fidelity (Wi-Fi) direct, or infrared data association (IrDA)) or the second network 2099 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 2092 may identify and authenticate the electronic device 2001 in a communication network, such as the first network 2098 or the second network 2099, using subscriber information (e.g., international mobile subscriber identity (IMSI)) stored in the subscriber identification module 2096.

The wireless communication module 2092, comprising communication circuitry, may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 2092 may support a high-frequency band (e.g., the mmWave band) to achieve, e.g., a high data transmission rate. The wireless communication module 2092 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 2092 may support various requirements specified in the electronic device 2001, an external electronic device (e.g., the electronic device 2004), or a network system (e.g., the second network 2099). According to an embodiment, the wireless communication module 2092 may support a peak data rate (e.g., 20 Gbps or more) for implementing eMBB, loss coverage (e.g., 2064 dB or less) for implementing mMTC, or U-plane latency (e.g., 0.5 ms or less for each of downlink (DL) and uplink (UL), or a round trip of 20 ms or less) for implementing URLLC.

The antenna module 2097, comprising at least one antenna, may transmit or receive a signal or power to or from the outside (e.g., the external electronic device) of the electronic device 2001. According to an embodiment, the antenna module 2097 may include an antenna including a radiating element composed of a conductive material or a conductive pattern formed in or on a substrate (e.g., a printed circuit board (PCB)). According to an embodiment, the antenna module 2097 may include a plurality of antennas (e.g., array antennas). In such a case, at least one antenna appropriate for a communication scheme used in the communication network, such as the first network 2098 or the second network 2099, may be selected, for example, by the communication module 2090 (e.g., the wireless communication module 2092) from the plurality of antennas. The signal or the power may then be transmitted or received between the communication module 2090 and the external electronic device via the selected at least one antenna. According to an embodiment, another component (e.g., a radio frequency integrated circuit (RFIC)) other than the radiating element may be additionally formed as part of the antenna module 2097.

According to various embodiments, the antenna module 2097 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on, directly or indirectly, a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 2001 and the external electronic device 2004 via the server 2008 coupled with the second network 2099. Each of the electronic devices 2002 or 2004 may be a device of a same type as, or a different type, from the electronic device 2001. According to an embodiment, all or some of operations to be executed at the electronic device 2001 may be executed at one or more of the external electronic devices 2002, 2004, or 2008. For example, if the electronic device 2001 should perform a function or a service automatically, or in response to a request from a user or another device, the electronic device 2001, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 2001. The electronic device 2001 may provide the outcome, with or without further processing of the outcome, as at least part of a reply to the request. To that end, a cloud computing, distributed computing, mobile edge computing (MEC), or client-server computing technology may be used, for example. The electronic device 2001 may provide ultra low-latency services using, e.g., distributed computing or mobile edge computing. In another embodiment, the external electronic device 2004 may include an internet-of-things (IoT) device. The server 2008 may be an intelligent server using machine learning and/or a neural network. According to an embodiment, the external electronic device 2004 or the server 2008 may be included in the second network 2099. The electronic device 2001 may be applied to intelligent services (e.g., smart home, smart city, smart car, or healthcare) based on 5G communication technology or IoT-related technology.

The electronic device according to an example embodiment may reduce the size of the radar system by including a switch within an integrated circuit (IC) for a radar system for forming a virtual antenna array.

As described above, according to an embodiment, an electronic device (e.g., an electronic device 101) may comprise an integrated circuit (IC)(e.g., an IC 150) comprising a switch (e.g., a switch 230) and a plurality of paths that comprises a first transmit (Tx) path (e.g., a first Tx path 201), a second Tx path (e.g., a second Tx path 202), a first receive (Rx) path (e.g., a first Rx path 211), and a second Rx path (e.g., a second Rx path 212); a first antenna (e.g., a first antenna 221) electrically connected, directly or indirectly, with the first Tx path from among the plurality of paths; a second antenna (e.g., a second antenna 222) electrically connectable with the second Tx path or the second Rx path from among the plurality of paths via the switch; a third antenna (e.g., a third antenna 223) electrically connected with the first Rx path from among the plurality of paths; and at least one processor (e.g., a processor 120), operably coupled with the IC. In an embodiment, at least one processor may be configured to receive, through the second antenna electrically connected, directly or indirectly, with the second Rx path via the switch and the third antenna electrically connected, directly or indirectly, with the first Rx path, first reflection signals regarding a first signal transmitted within a first time interval through the first antenna electrically connected, directly or indirectly, with the first Tx path, within the first time interval. In an embodiment, at least one processor may be configured to receive, through the third antenna electrically connected, directly or indirectly, with the first Rx path, second reflection signals regarding a second signal transmitted within a second time interval different from the first time interval through the second antenna electrically connected, directly or indirectly, via the switch with the second Tx path, within the second time interval.

In an embodiment, the third antenna may be disposed between the first antenna and the second antenna.

In an embodiment, the electronic device may further comprise a housing (e.g., a housing 500) comprising the IC, the first antenna, the second antenna, the third antenna, and the at least one processor. In an embodiment, the electronic device may further comprise a display (e.g., a display 140), exposed through a part of the housing, comprising a first periphery (e.g., a first periphery 501), a second periphery (e.g., a second periphery 502) parallel to the first periphery, a third periphery (e.g., a third periphery 503) extended from a first end of the first periphery to a first end of the second periphery facing the first end of the first periphery, and a fourth periphery (e.g., a fourth periphery 504) extended from a second end of the first periphery to a second end of the second periphery facing the second end of the first periphery, the fourth periphery parallel to the third periphery. In an embodiment, the first antenna, the second antenna, and the third antenna may be disposed along the first periphery.

In an embodiment, the first antenna, the second antenna, and the third antenna may be disposed on, directly or indirectly, a metal plate (e.g., a metal plate 600) that has a mesh pattern and is disposed along the first periphery when viewed from above the display. In an embodiment, the metal plate may be included in/overlap the display when viewed from above the display.

In an embodiment, the housing may comprise a surface that comprises the display and a bezel area (e.g., a bezel area 510) surrounding the display. In an embodiment, the electronic device may further comprise at least one connector (e.g., at least one connector 610) that is disposed under the bezel area and is disposed along a periphery of the surface of the housing parallel to the first periphery of the display. In an embodiment, the electronic device may further comprise a first feedline (e.g., a first feedline 621) extended from the first antenna to the at least one connector; a second feedline (e.g., a second feedline 622) extended from the second antenna to the at least one connector; and a third feedline (e.g., a third feedline 623) extended from the third antenna to the at least one connector. In an embodiment, the at least one connector may be configured to electrically connect the IC with each of the first antenna, the second antenna, and the third antenna.

In an embodiment, the at least one processor may be configured to receive, within the first time interval, the first reflection signals through the second antenna and the third antenna. In an embodiment, the at least one processor may be configured to control, in response to the reception of the first reflection signals, the switch to electrically disconnect the second Rx path from the second antenna and electrically connect the second Tx path with the second antenna. In an embodiment, the at least one processor may be configured to receive, based on the controlling of the switch, the second reflection signals through the third antenna within the second time interval.

In an embodiment, the electronic device may further comprise a fourth antenna (e.g., a fourth antenna 224). In an embodiment, the IC further may comprise a third Rx path (e.g., a third Rx path 213). In an embodiment, the fourth antenna may be electrically connected with the third Rx path. In an embodiment, the at least one processor may be configured to receive, through the second antenna, the third antenna, and the fourth antenna, the first reflection signals regarding the first signal for use of three virtual antennas in a virtual antenna array, within the first time interval. In an embodiment, the at least one processor may be configured to receive, through the third antenna and the fourth antenna, the second reflection signals regarding the second signal for use of two virtual antennas in the virtual antenna array, within the second time interval, the two virtual antennas distinct from the three virtual antennas.

In an embodiment, the first Tx path may comprise a first power amplifier (PA) (e.g., a first PA 241) for setting Tx power of the first signal. In an embodiment, the second Tx path may comprise a second PA (e.g., a second PA 242) for setting Tx power of the second signal. In an embodiment, the first Rx path may comprise a first low noise amplifier (LNA) (e.g., a first LNA 251), a first mixer, and/or a first filter. In an embodiment, the second Rx path may comprise a second LNA (e.g., a second LNA 252), a second mixer, and/or a second filter.

In an embodiment, the switch may be configured to, based on controlling of the at least one processor, electrically connect the second PA with the second antenna or electrically connect the second LNA with the second antenna.

In an embodiment, the at least one processor may be configured to receive the first reflection signals through the second antenna and the third antenna within the first time interval. In an embodiment, the at least one processor may be configured to control, in response to the reception of the first reflection signals, the switch to electrically disconnect the second Rx path from the second antenna and electrically connect the second antenna with the second Tx path. In an embodiment, the at least one processor may be configured to turn on, in response to the controlling of the switch, the second PA. In an embodiment, the at least one processor may be configured to transmit the second signal through the second antenna by using the second PA that is turned on. In an embodiment, the at least one processor may be configured to receive the second reflection signals regarding the second signal through the third antenna within the second time interval.

In an embodiment, the at least one processor may be configured to obtain at least one of first data regarding relative location relation between the electronic device and an external object around the electronic device, second data regarding movement of the external object, or third data regarding posture of the external object, based on the first reflection signals and the second reflection signals.

In an embodiment, each of the first reflection signals may be a signal that the first signal is reflected from the external object. In an embodiment, each of the second reflection signals may be a signal that the second signal is reflected from the external object.

In an embodiment, the IC may comprise at least one IC that is used for communication with an external electronic device, for supporting an antenna array comprising a plurality of antenna elements. In an embodiment, each of the first time interval and the second time interval may be distinct from a third time interval that communicates with an external electronic device via the at least one IC.

In an embodiment, the first antenna may be disposed in a first direction from the third antenna. In an embodiment, the second antenna may be disposed in a second direction different from the first direction from the third antenna. In an embodiment, the at least one processor may be configured to receive, through the second antenna and the third antenna, the first reflection signals, within the first time interval, for use of a first virtual antenna and a second virtual antenna located in the second direction from the first virtual antenna. In an embodiment, the at least one processor may be configured to receive, through the third antenna, the second reflection signals, within the second time interval, for use of a third virtual antenna located in a third direction opposite to the first direction from the second virtual antenna.

In an embodiment, each of the first signal and the second signal may be a signal having frequency changed according to time.

As described above, according to an embodiment, an electronic device (e.g., electronic devices 101) may comprise a plurality of antennas comprising a first antenna (e.g., a first antenna 1511), a second antenna (e.g., a second antenna 1512), a third antenna (e.g., a fifth antenna 1515), a fourth antenna (e.g., a sixth antenna 1516), a fifth antenna (e.g., a third antenna 1513), and a sixth antenna (e.g., a fourth antenna 1514); an integrated circuit (IC) (e.g., an IC 150) comprising a first switch (e.g., the first switch 1500), a second switch (e.g., the second switch 1550), a transmit (Tx) path (e.g., a Tx path 1501) electrically connectable with the first antenna or the second antenna from among the plurality of antennas via the first switch, a first receive (Rx) path (e.g., a second Rx path 1522), electrically connected with the third antenna from among the plurality of antennas, a second Rx path (e.g., a third Rx path 1523) electrically connected with the fourth antenna from among the plurality of antennas, and a third Rx path (e.g., a first Rx path 1521) electrically connectable with the fifth antenna or sixth antenna from among the plurality of antennas via the second switch; and at least one processor (e.g., a processor 120), operably coupled, directly or indirectly, with the IC. In an embodiment, at least one processor may be configured to receive, through the third antenna, the fourth antenna, and the fifth antenna electrically connected with the third Rx path via the second switch, first reflection signals regarding a first signal transmitted within a first time interval through the first antenna electrically connected with the Tx path via the first antenna, within the first time interval. In an embodiment, at least one processor may be configured to receive, through the third antenna, the fourth antenna, and the sixth antenna electrically connected with the third Rx path via the second switch, second reflection signals regarding a second signal transmitted within a second time interval different from the first time interval, within the second time interval.

In an embodiment, the at least one processor may be configured to receive the first reflection signals regarding the first signal transmitted through the first antenna, through the third antenna, the fourth antenna, and the fifth antenna, within the first time interval. In an embodiment, the at least one processor may be configured to control, in response to the reception of the first reflection signals, the first switch to electrically disconnect the first antenna from the Tx path and electrically connect the second antenna with the Tx path. In an embodiment, the at least one processor may be configured to control, in response to the reception of the first reflection signals, the second switch to electrically disconnect the fifth antenna from the third Rx path and electrically connect the sixth antenna with the third Rx path. In an embodiment, the at least one processor may be configured to receive, through the third antenna, the fourth antenna, and the sixth antenna, the second reflection signals regarding the second signal transmitted through the second antenna, within the second time interval, based on the controlling of the first switch and the controlling of the second switch.

In an embodiment, a first direction from the first antenna to the second antenna may be different from a second direction from the fifth antenna to the sixth antenna.

As described above, according to an embodiment, an electronic device (e.g., an electronic devices 101) may comprise a plurality of antennas comprising a first antenna (e.g., a first antenna 1711), a second antenna (e.g., a second antenna 1712), a third antenna (e.g., a third antenna 1713), and a fourth antenna (e.g., a fourth antenna 1714); an integrated circuit (IC) (e.g., an IC 150) comprising a first switch (e.g., a first switch 1700), a second switch (e.g., a second switch 1750), a third switch (e.g., a third switch 1790), a transmit (Tx) path (e.g., a Tx path 1701) electrically connected with the first antenna via the first switch or electrically connected with the second antenna via the first switch and the third switch, a first receive (Rx) path (e.g., a first Rx path 1721) electrically connected with the second antenna via the second switch and the third switch or electrically connected with the third antenna via the second antenna, and a second Rx path (e.g., a second Rx path 1722) electrically connected with the fourth antenna; and at least one processor (e.g., a processor 120), operably coupled with the IC.

In an embodiment, at least one processor may be configured to receive, through the second antenna electrically connected, directly or indirectly, with the first Rx path via the second switch and the third switch and the fourth antenna electrically connected, directly or indirectly, with the second Rx path, first reflection signals regarding a first signal transmitted within a first time interval through the first antenna electrically connected, directly or indirectly, with the Tx path via the first switch, within the first time interval. In an embodiment, at least one processor may be configured to receive, through the third antenna electrically connected, directly or indirectly, with the first Rx path via the second switch and the fourth antenna electrically connected, directly or indirectly, with the second Rx path, second reflection signals regarding a second signal transmitted within a second time interval different from the first time interval through the second antenna electrically connected, directly or indirectly, with the Tx path via the first switch and the third switch, within the second time interval. In an embodiment, the at least one processor may be configured to receive, within the first time interval, the first reflection signals through the second antenna and the fourth antenna. In an embodiment, the at least one processor may be configured to control, in response to the reception of the first reflection signals, the first switch, the second switch, and the third switch to electrically disconnect the first antenna from the Tx path, electrically connect the Tx path with the second antenna via the first switch and the third switch, electrically disconnect the second antenna from the first Rx path, and electrically connect the first Rx path with the third antenna via the third switch. In an embodiment, the at least one processor may be configured to receive, within the second time interval, the second reflection signals regarding the second signal transmitted through the second antenna, through the third antenna and the fourth antenna, based on the controlling of the first switch, the second switch, and the third switch.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via at least a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC). Thus, each "module" herein may comprise circuitry.

Various embodiments as set forth herein may be implemented as software (e.g., the program 2040) including one or more instructions that are stored in a storage medium (e.g., internal memory 2036 or external memory 2038) that is readable by a machine (e.g., the electronic device 2001). For example, a processor (e.g., the processor 2020) of the machine (e.g., the electronic device 2001) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

Each embodiment herein may be used in combination with any other embodiment(s) described herein.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server. According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

What is claimed is:

1. An electronic device comprising:
integrated circuitry (IC) comprising a switch and a plurality of paths that comprise a first transmit (Tx) path, a second Tx path, a first receive (Rx) path, and a second Rx path;
a first antenna electrically connected with the first Tx path from among the plurality of paths;

34 a second antenna electrically connectable with the second Tx path or the second Rx path from among the plurality of paths via the switch;
a third antenna electrically connected with the first Rx path from among the plurality of paths, wherein the first, second, and third antennas are arranged in a straight line, and wherein the third antenna is positioned between the first and second antennas;
memory comprising one or more storage media storing instructions; and
at least one processor,
wherein the instructions, when executed by the at least one processor individually or collectively, cause the electronic device to:
receive, through the second antenna electrically connected with the second Rx path via the switch and the third antenna electrically connected with the first Rx path, first reflection signals regarding a first signal transmitted within a first time interval through the first antenna electrically connected with the first Tx path, within the first time interval; and
receive, through the third antenna electrically connected with the first Rx path, second reflection signals regarding a second signal transmitted within a second time interval different from the first time interval through the second antenna electrically connected via the switch with the second Tx path, within the second time interval.

2. The electronic device of claim 1, further comprising:
a housing comprising the IC, the first antenna, the second antenna, the third antenna, the memory, and the at least one processor; and
a display, visible from a front side of the housing, comprising a first periphery, a second periphery parallel to the first periphery, a third periphery extending from a first end of the first periphery to a first end of the second periphery corresponding to the first end of the first periphery, and a fourth periphery extending from a second end of the first periphery to a second end of the second periphery corresponding to the second end of the first periphery, the fourth periphery parallel to the third periphery,
wherein the first antenna, the second antenna, and the third antenna are disposed along the first periphery.

3. The electronic device of claim 2, wherein the first antenna, the second antenna, and the third antenna are disposed on a metal plate that has a mesh pattern and is disposed along the first periphery, and
wherein the metal plate is included in the display to be visible from the front side of the housing.

4. The electronic device of claim 3, wherein the front side of the housing comprises a surface that comprises the display and a bezel area surrounding the display,
wherein the electronic device further comprises:
at least one connector that is disposed under the bezel area and is disposed along a periphery of the front side of the housing parallel to the first periphery of the display;
a first feedline connecting the first antenna to the at least one connector;
a second feedline connecting the second antenna to the at least one connector; and
a third feedline connecting the third antenna to the at least one connector, and
wherein the at least one connector is configured to electrically connect the IC with each of the first antenna, the second antenna, and the third antenna.

5. The electronic device of claim 1, wherein the instructions, when executed by the at least one processor individually or collectively, cause the electronic device to:

receive, within the first time interval, the first reflection signals through the second antenna and the third antenna;

control, in response to the reception of the first reflection signals, the switch to electrically disconnect the second Rx path from the second antenna and electrically connect the second Tx path with the second antenna; and receive, based on the controlling of the switch, the second reflection signals through the third antenna within the second time interval.

6. The electronic device of claim 1, further comprising:

a fourth antenna, wherein the first, second, third, and fourth antennas are arranged in a straight line, and wherein the fourth antenna is positioned between the first and second antennas, wherein the IC further comprises a third Rx path, wherein the fourth antenna is electrically connected with the third Rx path, and wherein the instructions, when executed by the at least one processor individually or collectively, cause the electronic device to:

receive, through the second antenna, the third antenna, and the fourth antenna, the first reflection signals regarding the first signal for use of three virtual antennas in a virtual antenna array, within the first time interval; and receive, through the third antenna and the fourth antenna, the second reflection signals regarding the second signal for use of two virtual antennas in the virtual antenna array, within the second time interval, the two virtual antennas distinct from the three virtual antennas.

7. The electronic device of claim 1, wherein the first Tx path comprises a first power amplifier (PA) for setting Tx power of the first signal, wherein the second Tx path comprises a second PA for setting Tx power of the second signal, wherein the first Rx path comprises a first low noise amplifier (LNA), a first mixer, and/or a first filter, and wherein the second Rx path comprises a second LNA, a second mixer, and/or a second filter.

8. The electronic device of claim 7, wherein the switch is configured to, based on controlling of the at least one processor, electrically connect the second PA with the second antenna or electrically connect the second LNA with the second antenna.

9. The electronic device of claim 7, wherein the instructions, when executed by the at least one processor individually or collectively, cause the electronic device to:

receive the first reflection signals through the second antenna and the third antenna within the first time interval;

control, in response to the reception of the first reflection signals, the switch to electrically disconnect the second Rx path from the second antenna and electrically connect the second antenna with the second Tx path;

turn on, in response to the controlling of the switch, the second PA;

transmit the second signal through the second antenna by using the second PA that is turned on; and receive the second reflection signals regarding the second signal through the third antenna within the second time interval.

10. The electronic device of claim 1, wherein the instructions, when executed by the at least one processor individually or collectively, cause the electronic device to obtain at least one of first data regarding relative location between the electronic device and an external object around the electronic device, based on the first reflection signals and the second reflection signals.

11. The electronic device of claim 1, wherein each of the first reflection signals is a signal that the first signal is reflected from the external object, and wherein each of the second reflection signals is a signal that the second signal is reflected from the external object.

12. The electronic device of claim 1, wherein the IC is used for communication with an external electronic device, by supporting an antenna array comprising a plurality of antenna elements, and wherein each of the first time interval and the second time interval is distinct from a third time interval that communicates with an external electronic device.

13. The electronic device of claim 1, wherein each of the first signal and the second signal is a signal having frequency changed according to time.

14. An electronic device comprising:

a plurality of antennas comprising a first antenna, a second antenna, a third antenna, a fourth antenna, a fifth antenna, and a sixth antenna, the first, third, and sixth antennas are arranged in a first straight line, wherein the second, fourth, and fifth antennas are arranged in a second straight line substantially parallel to the first straight line, wherein the sixth antenna is positioned between the first and third antennas, and wherein the fifth antenna is positioned between the second and fourth antennas;

integrated circuitry (IC) comprising:

a first switch, a second switch, a transmit (Tx) path electrically connectable with the first antenna or the second antenna from among the plurality of antennas via the first switch, a first receive (Rx) path electrically connected with the third antenna from among the plurality of antennas, a second Rx path electrically connected with the fourth antenna from among the plurality of antennas, and a third Rx path electrically connectable with the fifth antenna or sixth antenna from among the plurality of antennas via the second switch;

memory comprising one or more storage media storing instructions; and at least one processor wherein the instructions, when executed by the at least one processor individually or collectively, cause the electronic device to:

receive, through the third antenna, the fourth antenna, and the fifth antenna electrically connected with the third Rx path via the second switch, first reflection signals regarding a first signal transmitted within a first time interval through the first antenna electrically connected with the Tx path via the first switch, within the first time interval; and receive, through the third antenna, the fourth antenna, and the sixth antenna electrically connected with the third Rx path via the second switch, second reflection signals regarding a second signal transmitted through the second antenna electrically connected with the Tx path via the first switch within a second time interval different from the first time interval, within the second time interval.

15. The electronic device of claim 14, wherein the at least one processor is configured to:

receive the first reflection signals regarding the first signal transmitted through the first antenna, through the third antenna, the fourth antenna, and the fifth antenna, within the first time interval;

control, in response to the reception of the first reflection signals, the first switch to electrically disconnect the first antenna from the Tx path and electrically connect the second antenna with the Tx path;

control, in response to the reception of the first reflection signals, the second switch to electrically disconnect the fifth antenna from the third Rx path and electrically connect the sixth antenna with the third Rx path; and receive, through the third antenna, the fourth antenna, and the sixth antenna, the second reflection signals regarding the second signal transmitted through the second antenna, within the second time interval, based on the controlling of the first switch and the controlling of the second switch.

16. The electronic device of claim 14, wherein a first direction from the first antenna to the second antenna is different from a second direction from the fifth antenna to the sixth antenna.

17. An electronic device comprising:

a plurality of antennas comprising a first antenna, a second antenna, a third antenna, and a fourth antenna, wherein the first and third antennas are arranged in a first straight line, wherein the second and fourth antennas are arranged in a second straight line substantially parallel to the first straight line, and wherein a distance between the first and third antennas is different from a distance between the first and second antennas;

integrated circuitry (IC) comprising:

a first switch, a second switch, a third switch, a transmit (Tx) path:

electrically connected with the first antenna via the first switch, or electrically connected with the second antenna via the first switch and the third switch, a first receive (Rx) path:

electrically connected with the second antenna via the second switch and the third switch, or electrically connected with the third antenna via the third switch, and a second Rx path electrically connected with the fourth antenna;

memory comprising one or more storage media storing instructions; and at least one processor comprising processing circuitry, wherein the instructions, when executed by the at least one processor individually or collectively, cause the electronic device to:

receive, through the second antenna electrically connected with the first Rx path via the second switch and the third switch and the fourth antenna electrically connected with the second Rx path, first reflection signals regarding a first signal transmitted within a first time interval through the first antenna electrically connected with the Tx path via the first switch, within the first time interval; and receive, through the third antenna electrically connected with the first Rx path via the third switch and the fourth antenna electrically connected with the second Rx path, second reflection signals regarding a second signal transmitted within a second time interval different from the first time interval through the second antenna electrically connected with the Tx path via the first switch and the third switch, within the second time interval.

18. The electronic device of claim 17, wherein the instructions, when executed by the at least one processor individually or collectively, cause the electronic device to:

receive, within the first time interval, the first reflection signals through the second antenna and the fourth antenna;

control, in response to the reception of the first reflection signals, the first switch, the second switch, and the third switch to electrically disconnect the first antenna from the Tx path, electrically connect the Tx path with the second antenna via the first switch and the third switch, electrically disconnect the second antenna from the first Rx path, and electrically connect the first Rx path with the third antenna via the third switch; and receive, within the second time interval, the second reflection signals regarding the second signal transmitted through the second antenna, through the third antenna and the fourth antenna, based on the controlling of the first switch, the second switch, and the third switch.

* * * * *